US011826744B2

(12) United States Patent
Wu et al.

(10) Patent No.: US 11,826,744 B2
(45) Date of Patent: Nov. 28, 2023

(54) NEAR-INFRARED PHOTOTHERMAL CATALYST AND PREPARATION METHOD AND USE THEREOF

(71) Applicant: Jilin University, Jilin (CN)

(72) Inventors: Lixin Wu, Changchun (CN); Xiaofei Chen, Changchun (CN); Bao Li, Changchun (CN)

(73) Assignee: Jilin University, Changchun (CN)

( * ) Notice: Subject to any disclaimer, the term of this patent is extended or adjusted under 35 U.S.C. 154(b) by 3 days.

(21) Appl. No.: 17/873,223

(22) Filed: Jul. 26, 2022

(65) Prior Publication Data

US 2023/0076330 A1 Mar. 9, 2023

(30) Foreign Application Priority Data

Jul. 27, 2021 (CN) .......................... 202110850639.9

(51) Int. Cl.
*B01J 37/02* (2006.01)
*B01J 21/18* (2006.01)
*B01J 35/00* (2006.01)
*B01J 37/04* (2006.01)

(52) U.S. Cl.
CPC ........... *B01J 37/0236* (2013.01); *B01J 21/18* (2013.01); *B01J 35/004* (2013.01); *B01J 37/04* (2013.01)

(58) Field of Classification Search
CPC ...... B01J 37/0236; B01J 21/18; B01J 35/004; B01J 37/04; C01B 32/198; C07D 317/36

USPC ......................................... 502/174, 248, 263
See application file for complete search history.

(56) References Cited

U.S. PATENT DOCUMENTS

2004/0242903 A1 * 12/2004 Palanichamy ....... C07D 317/36
549/229

FOREIGN PATENT DOCUMENTS

| CN | 102745676 | A | * | 10/2012 | | |
|----|-----------|---|---|---------|---|---|
| CN | 103951564 | A | * | 7/2014 | .......... | C07C 67/297 |
| CN | 107890883 | A | * | 4/2018 | .............. | B01J 31/34 |
| CN | 113578360 | A | * | 11/2021 | .............. | B01J 27/24 |
| CN | 113546618 | B | * | 5/2022 | .............. | B01J 21/18 |
| KR | 101755523 | B1 | * | 7/2017 | .............. | B01J 21/04 |
| WO | WO-2008089065 | A1 | * | 7/2008 | ............ | B01J 23/002 |

* cited by examiner

*Primary Examiner* — Patricia L. Hailey
(74) *Attorney, Agent, or Firm* — Loginov & Associates, PLLC; William A. Loginov

(57) ABSTRACT

The present disclosure provides a near-infrared (NIR) photothermal catalyst and a preparation method and use thereof. The method includes: mixing a graphene oxide (GO) dispersion and a dehydrating agent to obtain a GO solution; mixing the GO solution and branched polyethyleneimine (PEI) and then drying to obtain a GO-PEI carrier; and mixing the GO-PEI carrier with water and adjusting a pH value to be within a range of 2 to 4.5, adding dropwise a monosubstituted Keggin-type polyoxometalate (POM) aqueous solution, and conducting an ion replacement reaction to obtain the NIR photothermal catalyst, wherein a solute of the monosubstituted Keggin-type POM aqueous solution is $K_6SiW_{11}Co(H_2O)O_{39}$ or $H_4SiW_{11}Ce(H_2O)_4O_{39}$.

16 Claims, 19 Drawing Sheets

NEAR-INFRARED PHOTOTHERMAL CATALYST AND PREPARATION METHOD AND USE THEREOF

CROSS REFERENCE TO RELATED APPLICATION

This patent application claims the benefit and priority of Chinese Patent Application No. 202110850639.9, entitled "Near-infrared photothermal catalyst and preparation method and use thereof" filed on Jul. 27, 2021, the disclosure of which is incorporated by reference herein in its entirety as part of the present application.

TECHNICAL FIELD

The present disclosure relates to the technical field of catalyst material preparation, and in particular to a near-infrared (NIR) photothermal catalyst and a preparation method and use thereof.

BACKGROUND ART

The increasing carbon dioxide ($CO_2$) emissions caused by human activities have brought about serious environmental problems and threatened human living conditions. In order to reduce carbon emissions, the efficient conversion of $CO_2$ into high-value-added products has become one of the adoptable methods in chemistry. Therefore, $CO_2$ has become very popular as a cheap and plentiful C1 resource for producing various valuable chemicals. However, the conversion of $CO_2$ still requires energy. Photocatalytic hydrogenation/photothermal hydrogenation and electrocatalytic hydrogenation are demonstrated to be very efficient methods. A range of reduction products has been produced, such as carbon monoxide, bicarbonate, formamide, methanol and even methane. The current light sources in use include mainly ultraviolet and visible (UV-vis) light, as well as a simulated solar spectrum in the high-energy region. However, as a matter of fact, from the organic synthesis point of view, the extension of the utilization of the solar spectrum to longer wavelengths is much limited.

From the sustainable chemistry point of view, cyclic carbonates from the cycloaddition of $CO_2$ with epoxides represent one of the promising routes to consuming greenhouse gases. The route not only achieves high atom-economy reactions but also obtains valuable products, like electrolytes in secondary batteries, monomers of polycarbonates, and the intermediates of fine chemicals. The work based on the design of homogeneous Lewis acid catalysts along with Lewis base co-catalysts has been widely reported. However, the relatively high reaction temperature and pressure, as well as the complicated separation of the products due to unsatisfactory conversion rate and selectivity require additional environmental cost and time. The fixation and activation of $CO_2$ are two committed steps during the cycloaddition reaction of $CO_2$ with epoxides. Therefore, the design of catalysts is necessary. Polyoxometalates (POMs) are a class of polyanionic clusters comprising oxides of early transition metals $MO_x$ (x is 5 or 6). A partial substitution by other transition metals endows the POMs with additional Lewis acidity. However, high temperature and high pressure are still required. Although photocatalysis is a way to solve the problem, relatively high light intensities and short wavelengths are usually required.

SUMMARY

In view of this, an objective of the present disclosure is to provide a NIR photothermal catalyst and a preparation method and use thereof. In the present disclosure, supported by the NIR photothermal conversion effect, the NIR photothermal catalyst obtained realizes dramatically enhanced $CO_2$ cycloaddition at normal temperatures and pressures.

To achieve the above objective, the present disclosure provides the following technical solutions.

The present disclosure provides a method for preparing a NIR photothermal catalyst, including:
- mixing a graphene oxide (GO) dispersion and a dehydrating agent to obtain a GO solution;
- mixing the GO solution and branched polyethyleneimine (PEI) and then drying to obtain a GO-PEI carrier; and
- mixing the GO-PEI carrier with water and adjusting a pH value to be within a range of 2 to 4.5, adding dropwise a monosubstituted Keggin-type polyoxometalate (POM) aqueous solution, and conducting an ion replacement reaction to obtain the NIR photothermal catalyst, where a solute of the monosubstituted Keggin-type POM aqueous solution is $K_6SiW_{11}Co(H_2O)O_{39}$ or $H_4SiW_{11}Ce(H_2O)_4O_{39}$.

In some embodiments, a molar ratio of GO to PEI in the GO-PEI carrier is 5:1, 1:1, 1:5, 1:10, 1:20, 1:40 or 1:100.

In some embodiments, a molecular weight $M_w$ of branched PEI is 1,800.

In some embodiments, the pH value is adjusted with a hydrochloric acid solution; the hydrochloric acid solution has a concentration of 1.0 mol/L.

In some embodiments, the ion replacement reaction is conducted at room temperature; the ion replacement reaction is conducted for 12 h to 24 h.

The present disclosure further provides a NIR photothermal catalyst prepared by the method according to the above technical solutions, including a GO-PEI carrier and a POM loaded on a surface of the GO-PEI carrier, where the POM is $K_6SiW_{11}Co(H_2O)O_{39}$ or $H_4SiW_{11}Ce(H_2O)_4O_{39}$; the POM is electrostatically attached to the surface of the GO-PEI carrier; in the GO-PEI carrier, branched PEI is covalently grafted to GO.

In some embodiments, a mass percentage of the POM in the NIR photothermal catalyst is within a range of 55% to 70%.

The present disclosure further provides use of the NIR photothermal catalyst according to the above technical solutions in the field of photothermal catalysis.

In some embodiments, the NIR photothermal catalyst is used in the form of a NIR photothermal catalyst solution; the NIR photothermal catalyst solution has a concentration of 5 mg/mL to 7 mg/mL.

In some embodiments, the NIR photothermal catalyst is used as a catalyst for a cycloaddition reaction of $CO_2$ and an epoxide.

The present disclosure provides a method for preparing a NIR photothermal catalyst, including: mixing a GO dispersion and a dehydrating agent to obtain a GO solution; mixing the GO solution and branched PEI and then drying to obtain a GO-PEI carrier; and mixing the GO-PEI carrier with water and adjusting a pH value to be within a range of 2 to 4.5, adding dropwise a monosubstituted Keggin-type POM aqueous solution, and conducting an ion replacement reaction to obtain the NIR photothermal catalyst, where a solute of the monosubstituted Keggin-type POM aqueous solution is $K_6SiW_{11}Co(H_2O)O_{39}$ (SiWCo) or $H_4SiW_{11}Ce(H_2O)_4O_{39}$ (SiWCe). In the present disclosure, the NIR photothermal effect is introduced into the composite catalyst. Based on Lewis acidity and structural priority, cobalt (Co) and cerium (Ce) monosubstituted Keggin-type POMs are electrostatically attached on a GO carrier with covalently grafted branched PEI, forming NIR photothermal catalysts, SiWCo@GO-PEI and SiWCe@GO-PEI composites. While PEI serves as both the connector of GO and POMs and Lewis base to act as a $CO_2$ adsorbent, the SiWCo and SiWCe afford Lewis acid to catalyze the cycloaddition reaction. The GO matrix not only integrates the adsorbent and the catalytic center for synergistic catalysis but also provides NIR photothermal for local heating, such that the catalyst accelerates the cycloaddition reaction of $CO_2$ and epoxides with a very high TOF (turnover frequency) value at gentle temperatures and atmospheric pressures. Moreover, the preparation method provided in the present disclosure can be carried out with easy operation, low cost, less energy consumption and environmental friendliness.

The present disclosure further provides a NIR photothermal catalyst prepared by the method according to the above technical solutions. The NIR photothermal properties are incorporated into multi-component catalysts. Through the electrostatic adsorption of Co-/Ce-substituted POMs on a GO matrix with covalently modified branched polyethyleneimine (PEI), the composite catalysts POMs@GO-PEI are prepared. Supported by the NIR photothermal conversion effect, the NIR photothermal catalyst realizes the dramatically enhanced $CO_2$ cycloaddition at normal temperatures and pressures. Moreover, the NIR photothermal catalyst exhibits an excellent catalytic activity with a turnover frequency TOF value up to 2718 $h^{-1}$, and has stable photothermal conversion properties and catalytic recyclability.

DETAILED DESCRIPTION OF THE EMBODIMENTS

Figure 1:
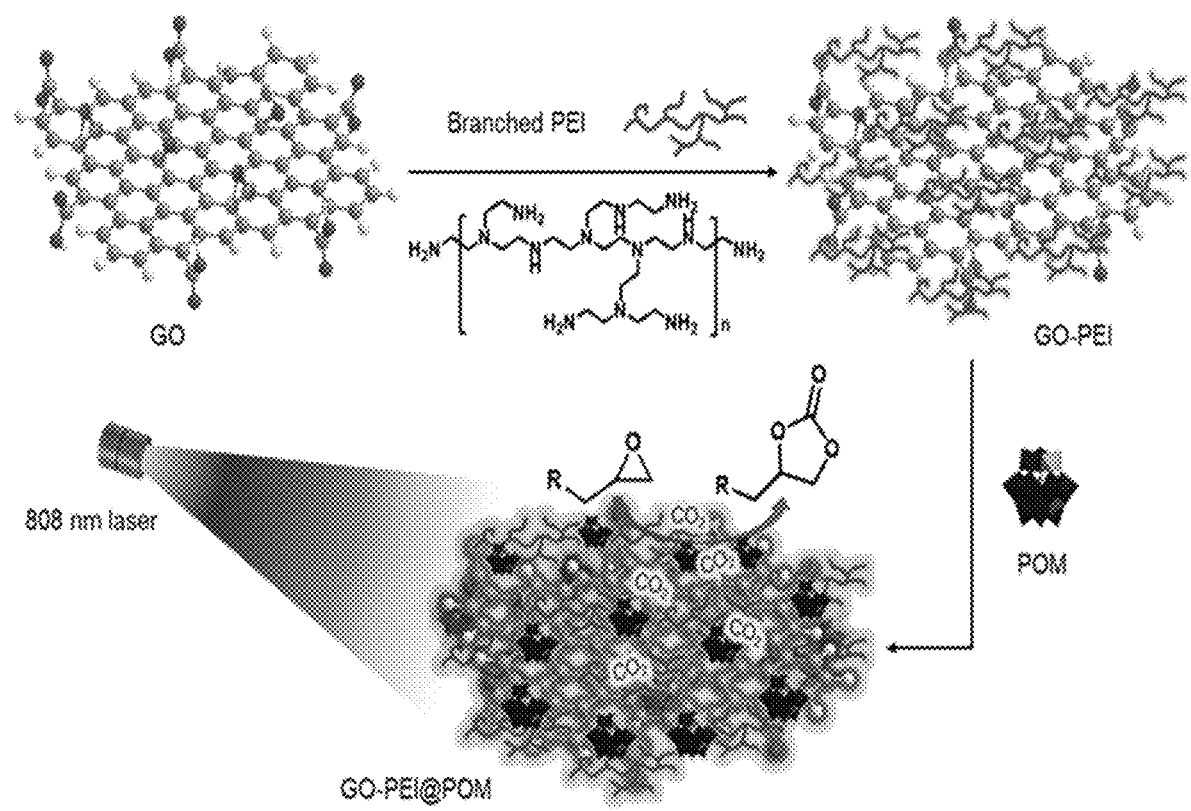
FIG. 1 shows a schematic illustration of the mechanism of the preparation of the NIR photothermal catalyst and their photothermal catalysis for the cycloaddition reaction of $CO_2$ and epoxides according to the present disclosure, in which POMs denote the SiWCo and SiWCe clusters.

The present disclosure provides a method for preparing a NIR photothermal catalyst, including:
mixing a graphene oxide (GO) dispersion and a dehydrating agent to obtain a GO solution;
mixing the GO solution and branched poly ethyleneimine (PEI) and then drying to obtain a GO-PEI carrier; and
mixing the GO-PEI carrier with water and adjusting a pH value to be within a range of 2 to 4.5, adding dropwise a monosubstituted Keggin-type polyoxometalate (POM) aqueous solution, and conducting an ion replacement reaction to obtain the NIR photothermal catalyst, where a solute of the monosubstituted Keggin-type POM aqueous solution is $K_6SiW_{11}Co(H_2O)O_{39}$ or $H_4SiW_{11}Ce(H_2O)_4O_{39}$.

In the present disclosure, a GO dispersion is mixed with a dehydrating agent to obtain a GO solution.

In the present disclosure, the dehydrating agent is preferably 1-(3-dimethylaminopropyl)-3-ethylcarbodiimide hydrochloride. In the present disclosure, the dehydrating agent is preferably used in the form of a dehydrating agent solution; the dehydrating agent solution has a concentration of preferably 25 mg/mL.

In the present disclosure, preferably, 25 mL of ultrapure water is added to a beaker containing 25 mg of GO powders and a sonication is conducted for 30 min to obtain the GO dispersion. Then the dehydrating agent solution is added to the GO dispersion and a continuous sonication is conducted for 20 min to obtain the GO solution.

In the present disclosure, after obtaining the GO solution, the GO solution is mixed with branched PEI and then dried to obtain the GO-PEI carrier.

In the present disclosure, a molar ratio of GO to PEI in the GO-PEI carrier is preferably 5:1, 1:1, 1:5, 1:10, 1:20, 1:40 or 1:100.

In the present disclosure, a molecular weight $M_w$ of branched PEI is preferably 1,800.

In the present disclosure, branched PEI is preferably added in the form of a branched PEI solution; the branched PEI solution has a concentration of preferably 20 mg/mL.

In the present disclosure, the mixing is preferably conducted by conducting a sonication for 15 min, followed by stirring (1,200 rpm) at room temperature (25° C.) for 12 h.

In the present disclosure, the drying is preferably conducted by freeze-drying; the freeze-drying is preferably conducted in a vacuum freeze dryer.

After obtaining the GO-PEI carrier, the PEI loading content on the GO-PEI carrier is calculated according to the following formula: $N_{PEI}=N_{GO-PEI}/N_{PEI}$, where $N_{GO-PEI}$ and $N_{PEI}$ represent the N element mass fractions in the GO-PEI carrier and PEI, respectively.

In the present disclosure, after obtaining the GO-PEI carrier, the GO-PEI carrier is mixed with water and a pH value is adjusted to be 3, and a monosubstituted Keggin-type POM aqueous solution is added dropwise to conduct the ion replacement reaction to obtain the NIR photothermal catalyst, where a solute of the monosubstituted Keggin-type POM aqueous solution is $K_6SiW_{11}Co(H_2O)O_{39}$ (SiWCo) or $H_4SiW_{11}Ce(H_2O)_4O_{39}$ (SiWCe).

In the present disclosure, the pH value is preferably adjusted with a hydrochloric acid solution; the hydrochloric acid solution has a concentration of preferably 1.0 mol/L.

In the present disclosure, the pH value is preferably 3.

In the present disclosure, $K_6SiW_{11}Co(H_2O)O_{39}$ (SiWCo) or $H_4SiW_{11}Ce(H_2O)_4O_{39}$ (SiWCe) is prepared by a conventional method in the art. Specifically, the method refers to "M. Girardi, S. Blanchard, S. Griveau, P. Simon, M. Fontecave, F. Bedioui, A. Proust, Eur. J. Inorg. Chem. 2015, 2015, 3642-3648", or "O. A. Kholdeeva, M. N. Timofeeva, G. M. Maksimov, R. I. Maksimovskaya, W. A. Neiwert, C. L. Hill, Inorg. Chem. 2005, 44, 666-672".

In the present disclosure, $K_6SiW_{11}Co(H_2O)O_{39}$ (SiWCo) or $H_4SiW_{11}Ce(H_2O)_4O_{39}$ (SiWCe) is preferably used in the form of a $K_6SiW_{11}Co(H_2O)O_{39}$ (SiWCo) aqueous solution or a $H_4SiW_{11}Ce(H_2O)_4O_{39}$ (SiWCe) aqueous solution. There is no special limitation on the concentration of the $K_6SiW_{11}Co(H_2O)O_{39}$ (SiWCo) aqueous solution or the $H_4SiW_{11}Ce(H_2O)_4O_{39}$ (SiWCe) aqueous solution.

In the present disclosure, a mass percentage of the POM in the NIR photothermal catalyst is preferably within a range of 55% to 70%.

In the present disclosure, the ion replacement reaction is preferably conducted at room temperature; the ion replacement reaction is preferably conducted for 12 h to 24 h.

In the present disclosure, after the ion replacement reaction, the product obtained from the ion replacement reaction is preferably filtered and washed with water in sequence to obtain the NIR photothermal catalyst (POM@GO-PEI). There is no special limitation on the specific process of the filtration and water washing, and the processes well known to those skilled in the art can be used.

In the present disclosure, after obtaining the NIR photothermal catalyst, the POM loading content on the NIR photothermal catalyst is calculated according to the following formula: $N_{POM}=Si_{POM@GO-PEI}/Si_{POM}$ (based on Si), where $Si_{POM@GO-PEI}$ and $Si_{POM}$ represent the Si element mass fractions in the POM@GO-PEI and the POM, respectively.

FIG. 1 shows a schematic illustration for the mechanism of the preparation of the NIR photothermal catalysts and their photothermal catalysis for the cycloaddition reaction of $CO_2$ and epoxides according to the present disclosure, in which POMs denote the SiWCo and SiWCe clusters.

The present disclosure further provides a NIR photothermal catalyst prepared by the method according to the above technical solutions, including a GO-PEI carrier and a POM loaded on a surface of the GO-PEI carrier, where the POM is $K_6SiW_{11}Co(H_2O)O_{39}$ or $H_4SiW_{11}Ce(H_2O)_4O_{39}$; the POM is electrostatically attached on the surface of the GO-PEI carrier; in the GO-PEI carrier, branched PEI is covalently grafted to GO. The NIR photothermal catalysts are denoted as SiWCo@GO-PEI or SiWCe@GOPEI, respectively.

In the present disclosure, a mass percentage of the POM in the NIR photothermal catalyst is preferably within a range of 55% to 70%.

The present disclosure further provides use of the NIR photothermal catalyst according to the above technical solutions in the field of photothermal catalysis.

In the present disclosure, the NIR photothermal catalyst is preferably used in the form of a NIR photothermal catalyst solution, and the NIR photothermal catalyst solution has a concentration of preferably 5 mg/mL to 7 mg/mL. When the NIR photothermal catalyst is SiWCo@GO-PEI, the NIR photothermal catalyst solution has a concentration of preferably 5 mg/mL. When the NIR photothermal catalyst is SiWCe@GOPEI, the NIR photothermal catalyst solution has a concentration of preferably 7 mg/mL.

In the present disclosure, a solvent of the NIR photothermal catalyst solution is preferably epichlorohydrin.

In the present disclosure, the NIR photothermal catalyst is preferably used as a catalyst for a cycloaddition reaction of $CO_2$ and an epoxide.

In the present disclosure, the condition parameters of the cycloaddition reaction preferably include: a laser wavelength of 808 nm, a power of 1000 $mW \cdot cm^{-2}$, and a mechanical stirring rate of 1200 rpm.

To further illustrate the present disclosure, the NIR photothermal catalyst and the preparation method and use thereof provided by the present disclosure will be described in detail below with reference to examples which, however, should not be interpreted as limitations to the protection scope of the present disclosure.

Example 1

Materials and Characterizations
Materials and Reagents

Graphene oxide (GO) was purchased from X. F. nano Co., Ltd. (Nanjing, China). Polyethyleneimine (PEI), Mw≈1800, was purchased from Energy Chemical Co., Ltd. Dichloromethane (HPLC grade) was sourced from Sigma-Aldrich. Epichlorohydrin (97%), propylene oxide (98%), 1,2-epoxycyclohexane (99%), styreneoxide (97%), and 2-(phenoxymethyl) oxirane (97%) were purchased from Aladdin Co., Ltd. Ultrapure water was used throughout the experiments. All chemicals were not purified before use.

Instrument Characterizations

Organic elemental analysis was performed on a Vario microcube from Elementar. Fourier transform infrared (FT-IR) spectra were obtained on a Bruker Vertex 80 V spectrometer equipped with a DTGS detector (32 scans) with a resolution of 4 $cm^{-1}$ on a KBr pellet. Inductively coupled plasma (ICP) analysis was carried out on an OPTIMA 3300DV (Perkin Elmer company). Scanning Electron Microscopy (SEM) measurement was performed on a JEOL JSM-6700F field emission scanning electron microscope. Transmission Electron Microscopy (TEM), Energy dispersive spectroscopy (EDS), and Energy dispersive X-ray (EDX) element mapping were conducted on a field emission electron microscope (JEOL JEM-2100F) with an accelerating voltage of 200 KV. Thermogravimetric analysis (TGA) was carried out on a Perkin Elmer Diamond TG/DTA instrument with a heating rate of $10° C. \cdot min^{-1}$. UV-vis-NIR absorption spectra were carried out on a Lambda 365 spectrometer (PE) at room temperature. X-ray photoelectron spectroscopy (XPS) spectra were acquired on an ESCALAB 250 spectrometer from Thermo Company with a monochromic X-ray source (Al Kα line, 1486.6 eV). Zeta potentials were recorded on a Zetasizer NanoZS instrument (Malvern). Near-infrared laser is an 808 nm monochromatic source with an optical fiber coupler laser and adjustable output power from Xi'an Hxrld laser Tech Co., Ltd. The output power was calibrated by an optical power meter (CEL-NP2000-2) from Beijing Au-Light Tech Co., Ltd.

To a beaker containing GO powders (25 mg) was added water (25 mL), obtaining a suspension. The suspension was sonicated for 30 min to form a uniformly dispersed solution. Then, 1-(3-dimethylaminopropyl)-3-ethylcarbodiimide hydrochloride (EDC·HCl, 2 mL, at a concentration of 25 mg/mL), which was used as a dehydrating agent, was added to the solution. After 20 min of continuous sonication, PEI (500 mg at a concentration of 20 mg/mL) was added, obtaining a reaction mixture. The reaction mixture was sonicated for an additional 15 min and then stirred (1200 rpm) at room temperature (ca. 25° C.) for 12 h and filtered, obtaining a precipitate. The precipitate was collected, washed three times with water, and lyophilized in a vacuum freeze drier, obtaining a solid product. The solid product was collected. By fixing the mass of GO at 25 mg, different contents of PEI (5 mg, 25 mg, 125 mg, 250 mg, 500 mg and 1000 mg) were used for the same preparation, obtaining mGO:mPEI=5:1, 1:1, 1:5, 1:10, 1:20, 1:40 and 1:100 products. The PEI loading content on GO-PEI was calculated from the formula: $N_{PEI}=N_{GO-PEI}/N_{PEI}$, where $N_{GO-PEI}$ and $N_{PEI}$ were the N element mass fractions in the GO-PEI carrier and PEI, respectively.

POMs@GO-PEI were prepared via an ion-exchange method. The prepared GO-PEI (molar ratio 1:20, 20 mg) was dispersed in 5 mL of deionized water through sonication, obtaining a solution. The pH of the solution was adjusted to 3 with the addition of dilute HCl (1.0 mol/L). Then, a SiWCo (76.7 mg, 0.026 mmol) aqueous solution (3 mL) was added dropwise under vigorous stirring, obtaining a mixture solution. After stirring the mixture solution for 12 h at room temperature (to ensure ionic interaction), a simple filtration and washing with water gave the composite SiWCo@GO-PEI. The SiWCe@GO-PEI was prepared also following the same procedures after adjusting to the corresponding stable pH value. The POM loading contents on POMs@GO-PEI were calculated from the formula: $N_{POM}=Si_{POM@GO-PEI}/Si_{POM}$ (based on Si), where $Si_{POM@GO-PEI}$ and $Si_{POM}$ were the Si element mass fractions in the POMs@GO-PEI and the POMs, respectively.

Photothermal Effect Evaluation 1 mL of SiWCo@GO-PEI suspension in epichlorohydrin (5 mg/mL) or SiWCe@GO-PEI suspension in epichlorohydrin (7 mg/mL) was added into a quartz cell and irradiated with an 808 nm NIR laser with a power density of 1000 mW/cm$^2$ for a certain time at room temperature. Then, the laser was turned off. The temperature changes of the POM@GO-PEI suspension were recorded every 30 s. An equivalent amount of epichlorohydrin was set as a control panel under the same condition. Each of the experiments was parallelly repeated three times, and the average value was adopted as the final result.

Photothermal Catalysis Experiment

The catalyst SiWCo@GO-PEI (10 mg) or SiWCe@GO-PEI (14 mg), epoxide (2 mL, 25.5 mmol) and TBA·Br (322 mg, 1 mmol) were weighed and added into a 5 mL round-bottom quartz flask. The flask was purged with $CO_2$ for 5 min to ensure a full $CO_2$ atmosphere for the reaction and then replaced by a $CO_2$ balloon. The reaction was mechanically stirred at 1200 rpm under an 808 nm laser-light (1000 mW/cm$^2$) radiation. The sample was taken for analysis at intervals. The conversion and yield were calculated using $^1$H NMR. After the reaction, the catalyst was collected by filtration and washed with ethanol. After drying, the catalyst was recovered and used for the next cycle. For the controlled reaction, thermal catalytic experiments of POMs@GO-PEI were conducted by removing the light source, and selecting an oil bath as an external heating source, and the other reaction conditions remained unchanged.

Synthesis and Characterization of GO-PEI Carrier

The branched PEI containing many primary, secondary and tertiary amino groups is covalently connected to carboxyl groups on the surface of GO via amidation reaction, forming a GO-PEI carrier. A series of GO-PEI with different initial mixing ratios were prepared, where mGO:mPEI was 5:1, 1:1, 1:5, 1:10, 1:20 and 1:100. The grafting amounts of PEI on the GO surface were estimated with elemental analysis (EA) (Table 1). Given that the N element originated only from the PEI component, the percentage change of the N element in the prepared samples represented the different content of PEI in the GO-PEI carrier. With an increase in the initial PEI concentration, more PEI components are found to be grafted to the GO surface, but a grafting efficiency growth trend gradually slows down. Accompanying the amount of modification increases, the increase of steric limitation and electrostatic repulsion restricts further covering of PEI molecules. At the initial mixing ratio of GO to PEI reached 1:20, the loading of PEI is close to 43.86%, and further increasing the amount of PEI leads to a small change in loading. Taking into account the efficiency of grafting amount and yield, the product with an initial ratio of GO to PEI of 1:20 was selected for detailed characterization.

TABLE 1

Elemental analysisa of GO, PEI and GO-PEI[a]

| Sample | C (wt %) | H (wt %) | N (wt %) | $PEI_{loading}$ (wt %)[a] |
|---|---|---|---|---|
| GO | 40.63 | 3.737 | — | — |
| PEI | 55.71 | 11.800 | 32.49 | — |
| GO-PEI$_{5:1}$ | 60.23 | 6.381 | 4.97 | 15.30 |
| GO-PEI$_{1:1}$ | 61.76 | 6.287 | 7.54 | 23.21 |
| GO-PEI$_{1:10}$ | 62.53 | 5.812 | 11.52 | 35.47 |
| GO-PEI$_{1:20}$ | 63.58 | 5.694 | 14.25 | 43.86 |
| GO-PEI$_{1:100}$ | 61.27 | 5.715 | 15.03 | 46.26 |

[a]The calculation formula of PEI loading in GO-PEI is $PEI_{loading}$ (wt %) = $N_{GO-PEI}/N_{PEI}$, where $N_{GO-PEI}$ and $N_{PEI}$ represent the percentages of nitrogen in GO-PEI and PEI, respectively.
The measurement result of each sample was measured 3 times and averaged.

Figure 2:
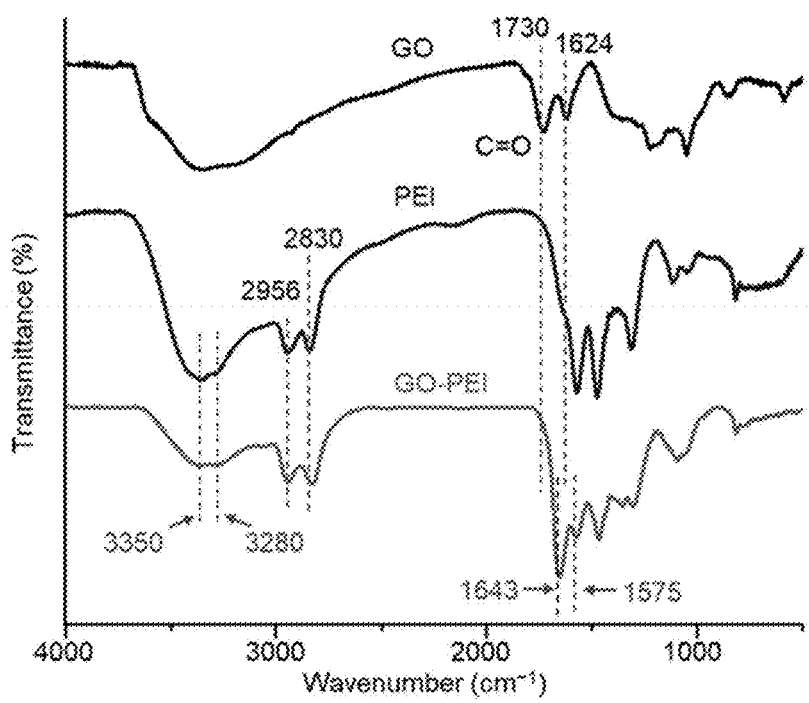
FIG. 2 shows FT-IR spectra of GO, PEI and GO-PEI.

Fourier transform infrared spectroscopy confirms the successful amidation of the carboxyl group in GO with the amino group in PEI. The characteristic vibrations of the amide I band at 1643 cm$^{-1}$ and the amide II band at 1575 cm$^{-1}$ were observed (see FIG. 2). The vibration of the carboxylic group at 1730 cm$^{-1}$ disappears in GO-PEI, verifying the formation of amide linkages. The band ascribing to the skeletal vibration of un-oxidized graphitic domains from GO at 1624 cm$^{-1}$ is covered by the strong absorption of amide bonds. The absorptions appearing at 2830 and 2956 cm$^{-1}$ can be well ascribed to the symmetric and asymmetric stretching modes of the methylene (—$CH_2$—) groups in PEI, further supporting that PEI successfully grafts on the GO surface covalently. Additionally, the bands at 3280 and 3350 cm$^{-1}$ attributing to primary and secondary amino groups clearly indicate the existence of residual amino groups.

Figure 3:
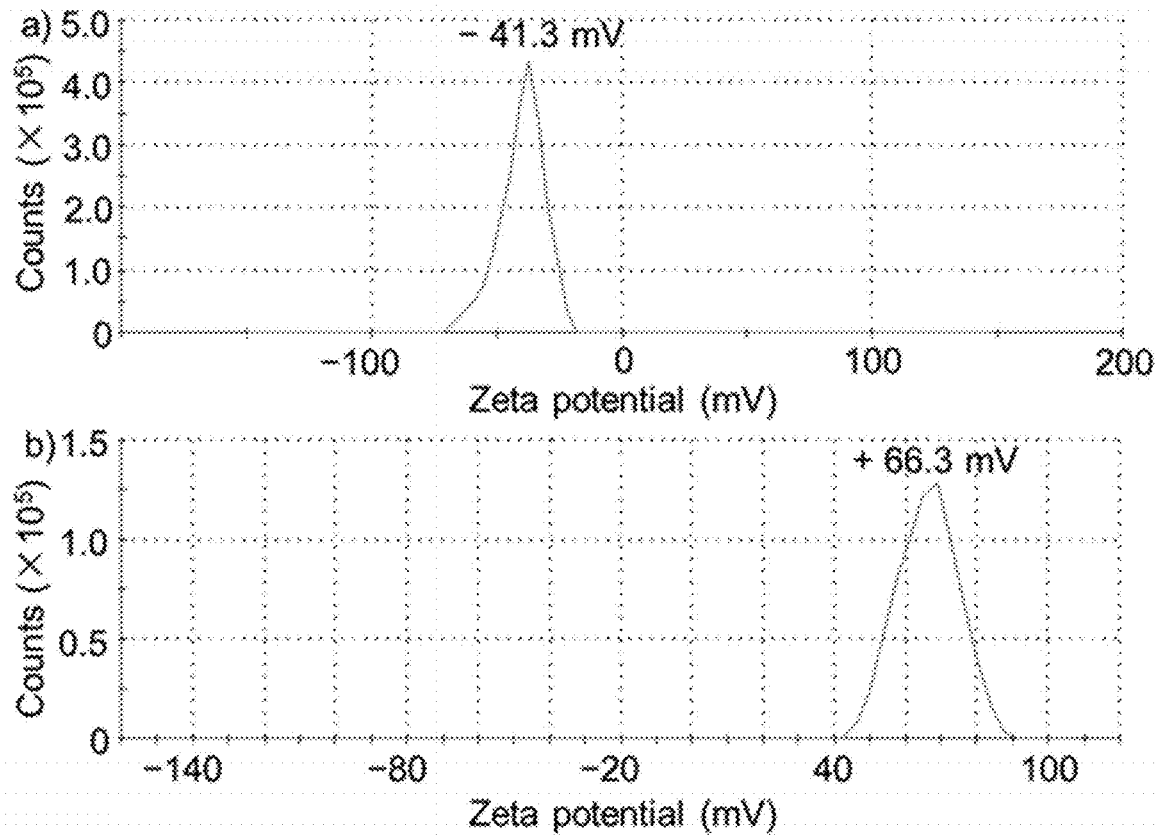
FIG. 3 shows zeta potential diagrams of GO and GO-PEI dispersed in water, in which panel a) represents GO and panel b) represents GO-PEI.

Due to the existence of periphery —COOH and the —OH groups, the zeta potential of original GO appears at −41.3 mV. After the covalent modification with partially protonated PEI, the zeta potential becomes +66.7 mV, indicating that there is some electrostatic interaction between GO and PEI. The value changes little even encountering a thorough washing with water, indicating that positive charges are successfully introduced onto negatively charged GO sheets (see FIG. 3).

Figure 4:
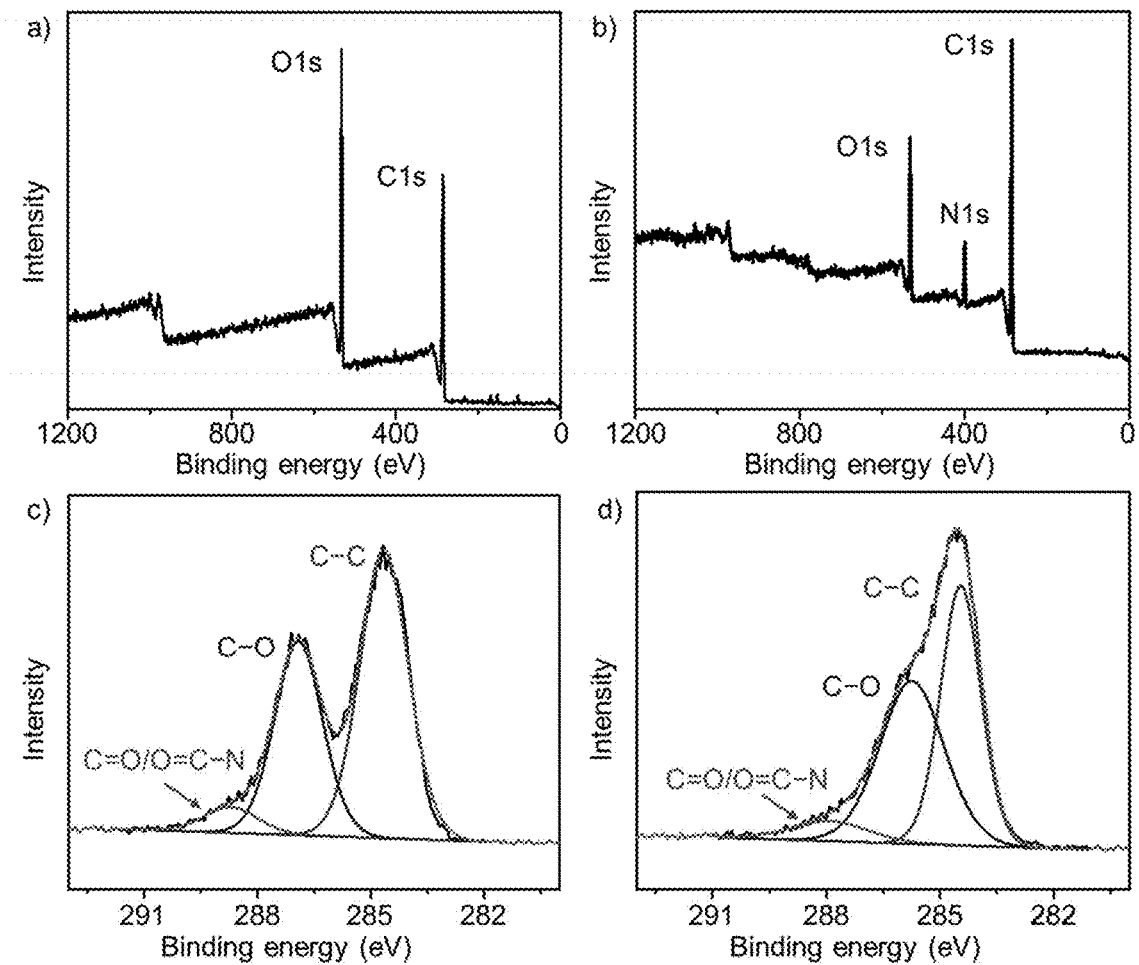
FIG. 4 shows XPS spectra and C1s spectra of GO and GO-PEI, in which panel a) represents the XPS spectrum of GO, panel b) represents the XPS spectrum of GO-PEI, panel c) represents the C1s spectrum of GO, and panel d) represents the C1s spectrum of GO-PEI.

XPS spectra further demonstrate the covalent modification of PEI on GO. In comparison to GO, PEI-modified GO shows an additional energy spectrum with a binding energy of 398.9 eV, which can be attributed to the N1s of the N element in PEI (see a) and b) in FIG. 4). By peak separation, the C1s of GO and PEI-modified GO showed three types of carbon oxidation states which can be ascribed to C—C (284.6 eV), C—O (286.3 eV), and C=O/O=CN (288.6 eV) (see c) and d) in FIG. 4). The corresponding content ratios of C=O/O=C—N, C—O and C—C in GO and GO-PEI are listed in Table 2. After modification, the content of the C—O group goes down slightly, implying that the —OH group is eliminated by an amidation reaction. At the same time, the content of the —C=O/O=C—N group increases slightly due to the conversion of the carboxyl group of GO into the carbonyl group of amide, indicating that PEI is successfully introduced into GO.

TABLE 2

Calculation results (number ratio) of C = O/O = C—N, C—O and C—C contents in GO and GO-PEI calculated from XPS spectra

| C1s | C = O/O = C—N (%) | C—O (%) | C—C (%) |
|---|---|---|---|
| GO | 5.53 | 37.73 | 56.74 |
| GO-PEI | 6.78 | 29.89 | 63.33 |

Figure 5:
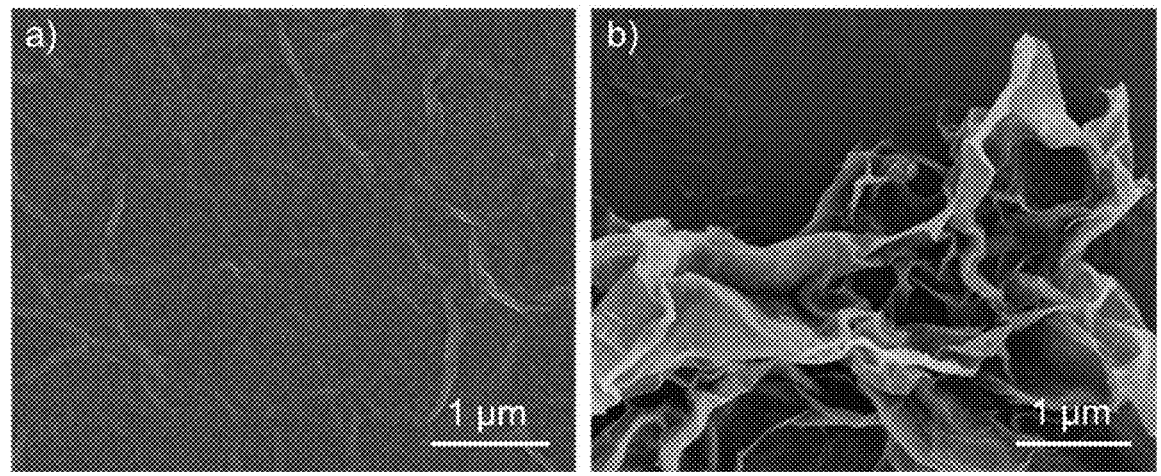
FIG. 5 shows a SEM image of GO and GO-PEI dispersed in water, in which panel a) represents GO and panel b) represents GO-PEI.
Figure 6:
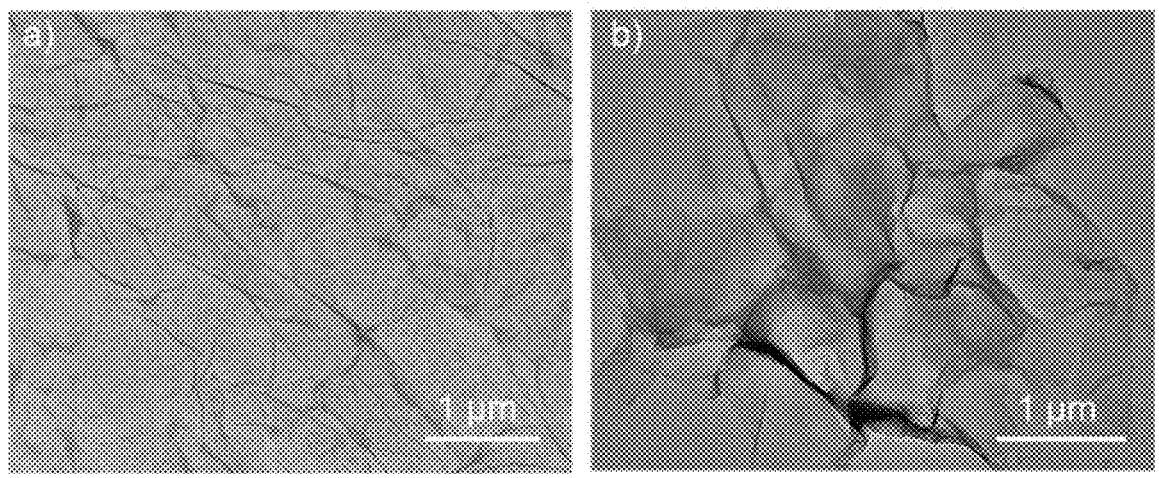
FIG. 6 shows a TEM image of GO and GO-PEI dispersed in water, in which panel a) represents GO and panel b) represents GO-PEI.

SEM recorded the morphology of GO-PEI. After covalent modification, the surface of GO becomes a bit rough and wrinkled relative to the smooth state of the initial GO, yet the nanosheet-like morphology is still remained (FIG. 5). TEM (FIG. 6) further revealed a similar change on the surface of GO-PEI. The maintained nanosheet-like morphology of the as-prepared GO-PEI carrier is favorable for the later modification of POMs and catalytic reactions.

Preparation and Characterization of POMs@GO-PEI Catalysis

Figure 7:
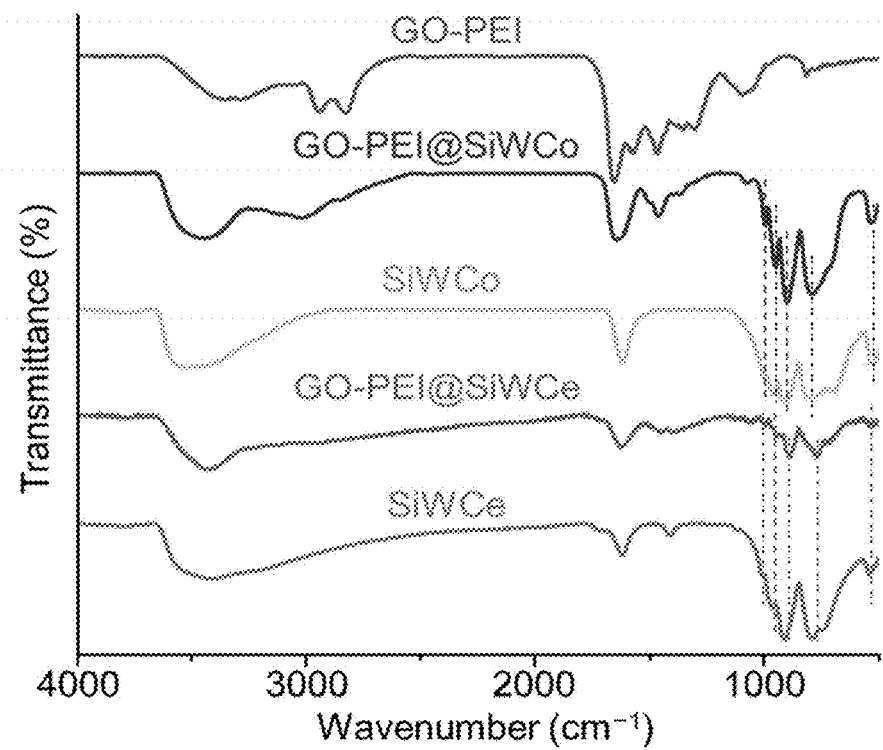
FIG. 7 shows infrared images of GO-PEI, SiWCo@GO-PEI, SiWCo, SiWCe@GOPEI and SiWCe.
Figure 8:
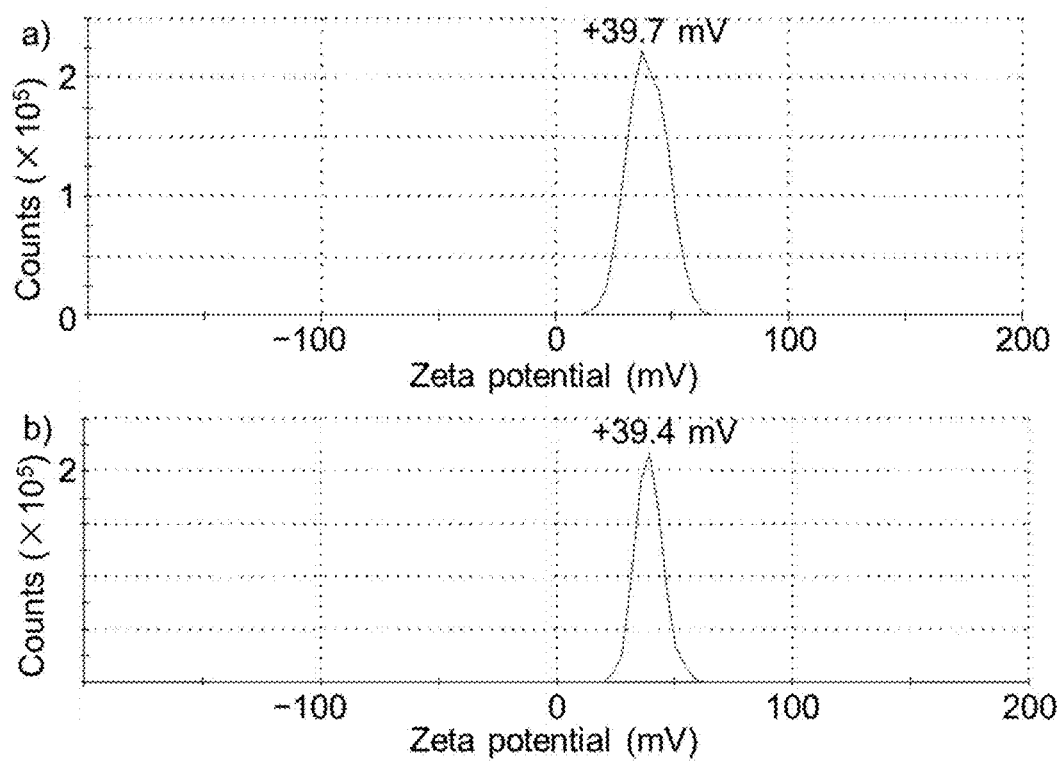
FIG. 8 shows zeta potential diagrams of SiWCo@GO-PEI and SiWCe@GOPEI, in which panel a) represents SiWCo@GO-PEI and panel b) represents SiWCe@GOPEI.
Figure 12:
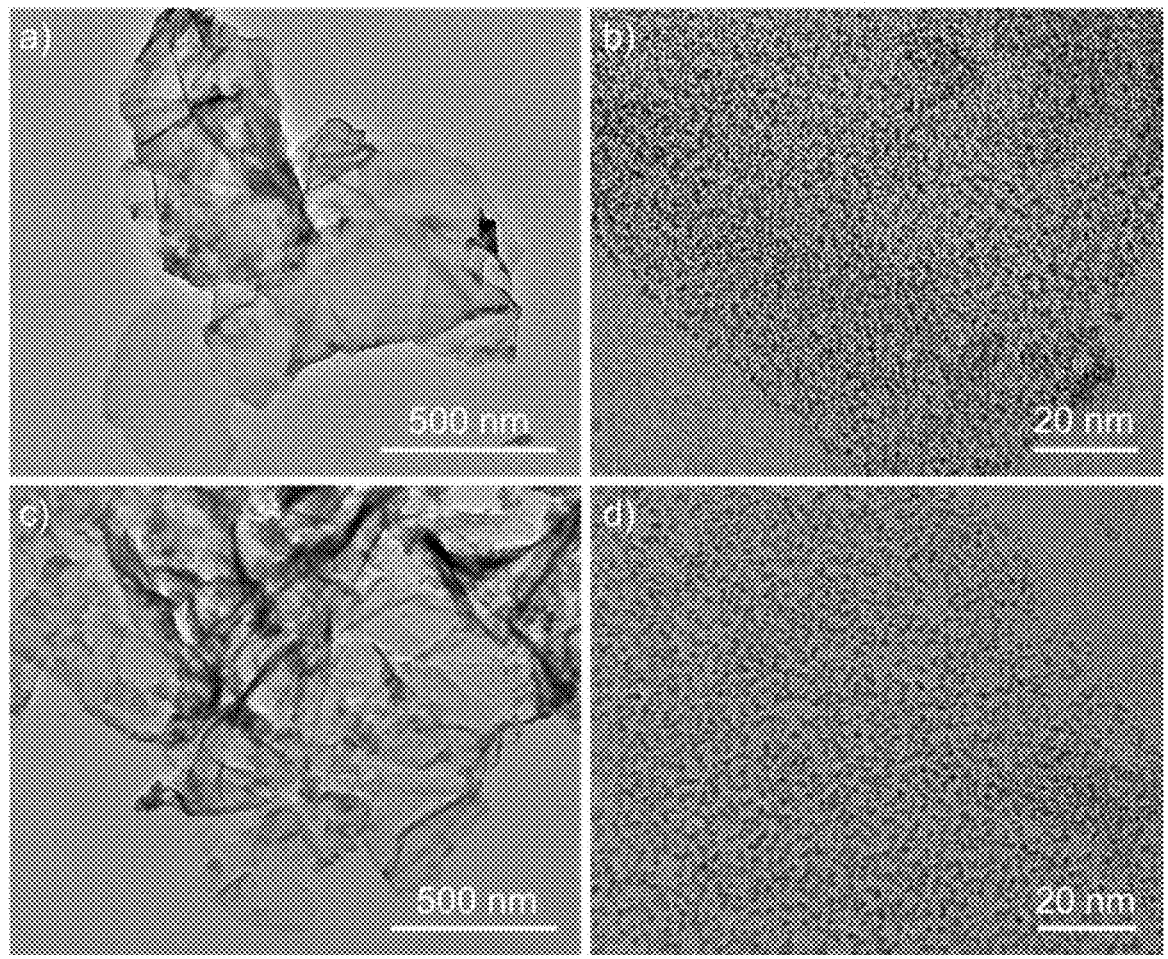
FIG. 12 shows TEM images of the SiWCo@GO-PEI dispersion in water and the SiWCe@GOPEI suspension in water, in which panel a) represents a large-area image of the SiWCo@GO-PEI dispersion in water, panel b) represents a local magnification image of the SiWCo@GO-PEI dispersion in water, panel c) represents a large-area image of the SiWCe@GOPEI suspension in water, and panel d) represents a local magnification image of the SiWCe@GOPEI suspension in water.
Figure 13:
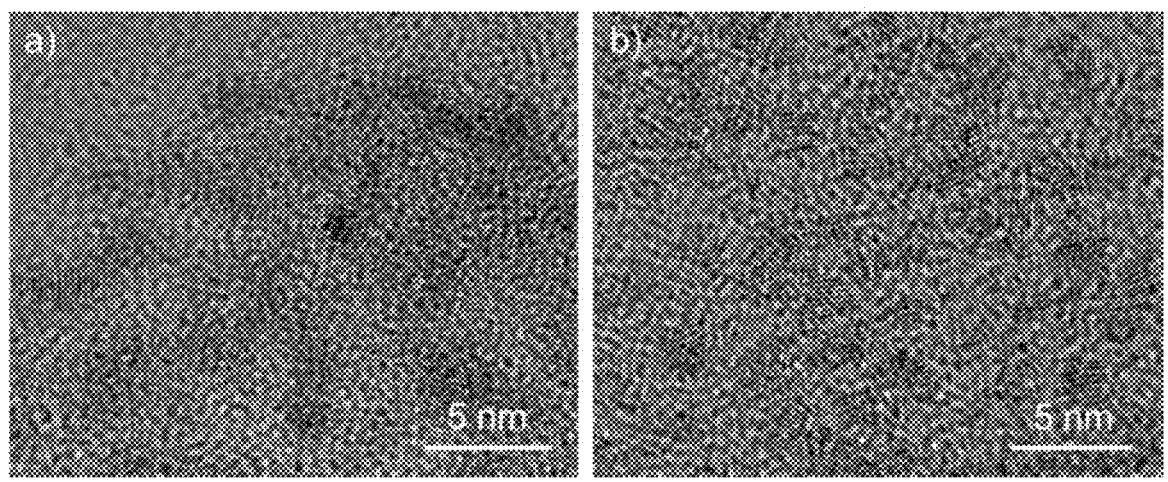
FIG. 13 shows high-resolution TEM images of SiWCo@GO-PEI and SiWCe@GOPEI, in which panel a) represents SiWCo@GO-PEI and panel b) represents SiWCe@GOPEI.
Figure 14:
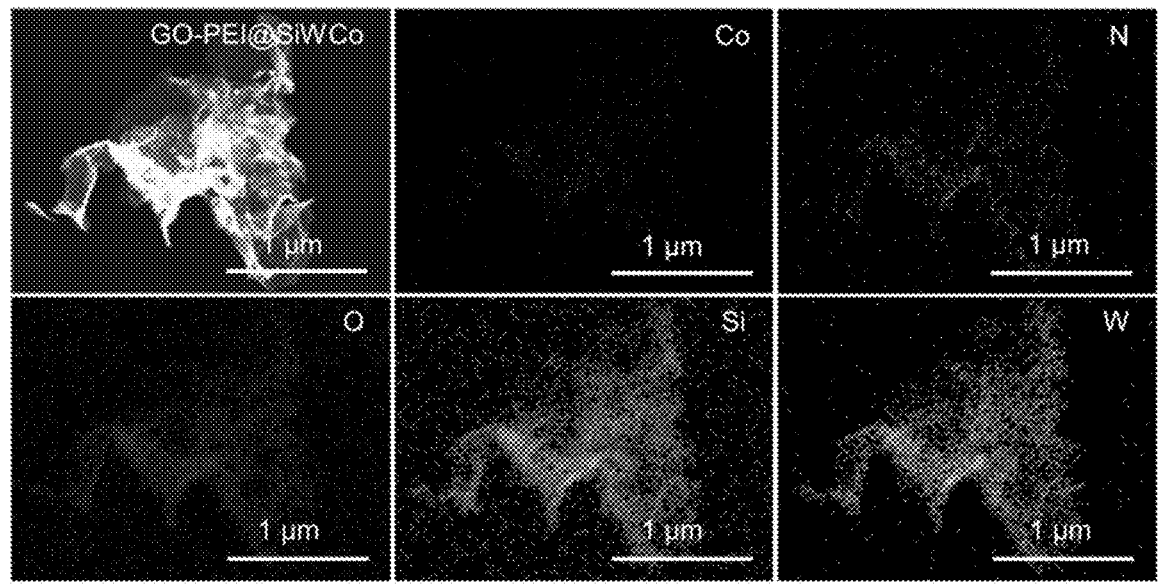
FIG. 14 shows an EDX element distribution diagram of SiWCo@GO-PEI.
Figure 15:
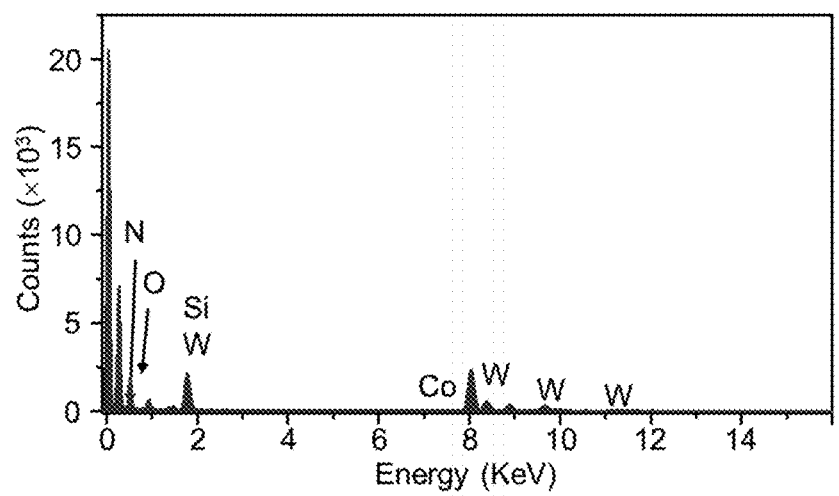
FIG. 15 shows an EDS image of SiWCo@GO-PEI.
Figure 16:
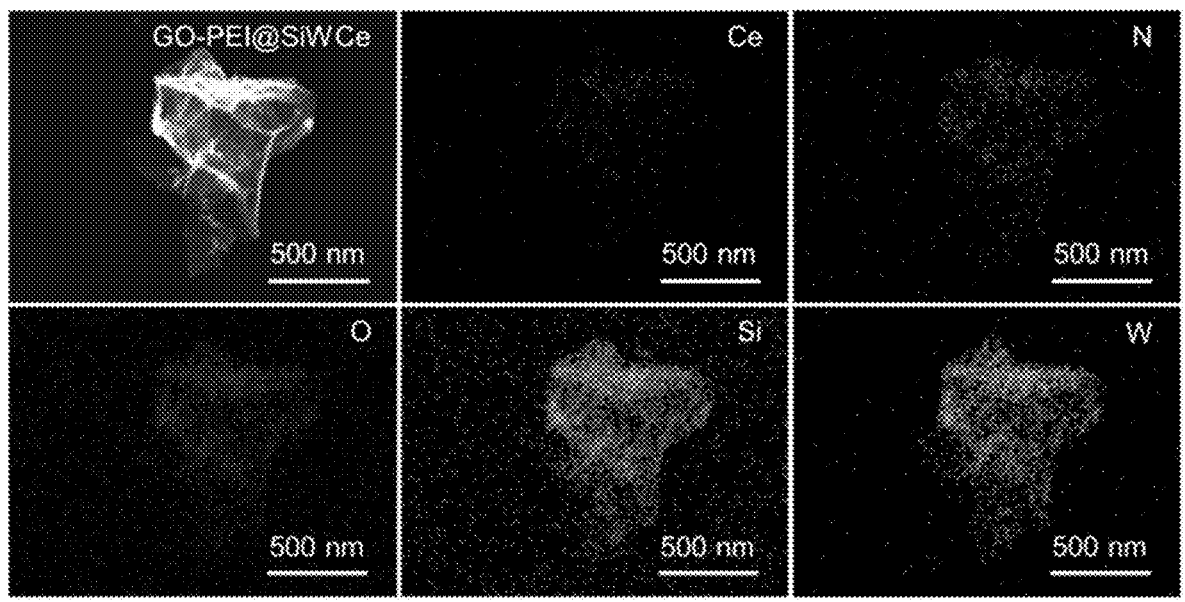
FIG. 16 shows an EDX element distribution diagram of SiWCe@GOPEI.
Figure 17:
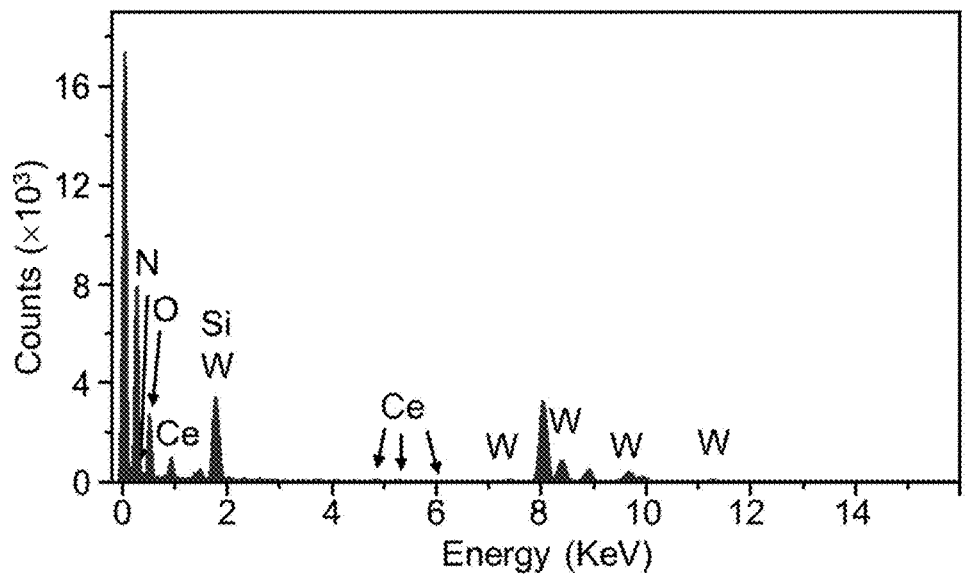
FIG. 17 shows an EDS image of SiWCe@GOPEI.

After protonation in HCl solution (1.0 mol/L), the residual amino groups in PEI were able to bind negatively-charged POMs via electrostatic interaction. An aqueous solution of SiWCo or SiWCe was added dropwise into the GO-PEI dispersion under stirring at room temperature, obtaining an ionic complex of GO-PEI and POM, namely SiWCo@GO-PEI or SiWCe@GOPEI composite. After the filtration and washing with water, the counter ions of both POMs and protonated GO-PEI, as well as unbound POMs were removed. The FT-IR spectra (FIG. 7) show that the characteristic vibration bands of SiWCo in SiWCo@GO-PEI appeared at 997 and 950 ($W=O_d$), 898 ($W—O_b—W$), 793 $cm^{-1}$ ($W—O_c—W$), which are in good agreement with the vibrations of bare cluster SiWCo at 999, 958, 906, 810 $cm^{-1}$. The slight changes support the electrostatic interactions between inorganic clusters with organic ammonium. The absorption bands of SiWCe in SiWCe@GOPEI at 995 and 948 ($W=O_d$), 891 ($W—O_b—W$), 770 ($W—O_c—W$) and 536 $cm^{-1}$ are also slightly changed compared to vibrational bands of bare cluster SiWCe, demonstrating the cluster structure sustainability and its binding with GO-PEI. The zeta potential measurement shows that the surface charge was shifted from +66.7 mV for GO-PEI to +39.7 mV for SiWCo@GO-PEI and +39.4 mV for SiWCe@GO-PEI (FIG. 8). The results confirm that the negatively charged POM was electrostatically attached to the surface of GO-PEI and partially neutralized the positively charged PEI, which was consistent with the FT-IR results. In order to determine the loading of SiWCo and SiWCe, ICP and organic elemental analysis are carried out on a POM-loaded GO-PEI carrier. The summary data (Table 3) shows that mass contents of SiWCo and SiWCe in the final POMs@GO-PEI reached 63.8% and 68.0% (based on Si), respectively. Meanwhile, the K element is not detected in the SiWCo@GO-PEI composite, indicating that the counter ions of SiWCo are almost completely replaced.

same as that of GO-PEI. The unstained TEM image shows that the morphological state of GO-PEI is preserved after POM electrostatic adsorption (FIG. 12). From the local amplification image, it is seen that the surface of the GO-PEI carrier nanosheets is uniformly covered by POM clusters. A large number of dark spots of the same size as the SiWCo and SiWCe clusters are scattered on the nanosheet without obvious agglomeration, even though the images show overlapping clusters on both sides. The high-resolution TEM (HRTEM) image further shows well-discerned individual clusters bearing particle diameters in the range of about 0.8 nm to 1.2 nm (FIG. 13). Meanwhile, EDX elemental mapping indicates the uniform distribution of SiWCo and SiWCe on the surface of GO-PEI (FIG. 14 to FIG. 17), which was beneficial to the efficient conversion of subsequent catalytic reactions.

Thermal Stability of POMs@GO-PEI Catalyst

Figure 18:
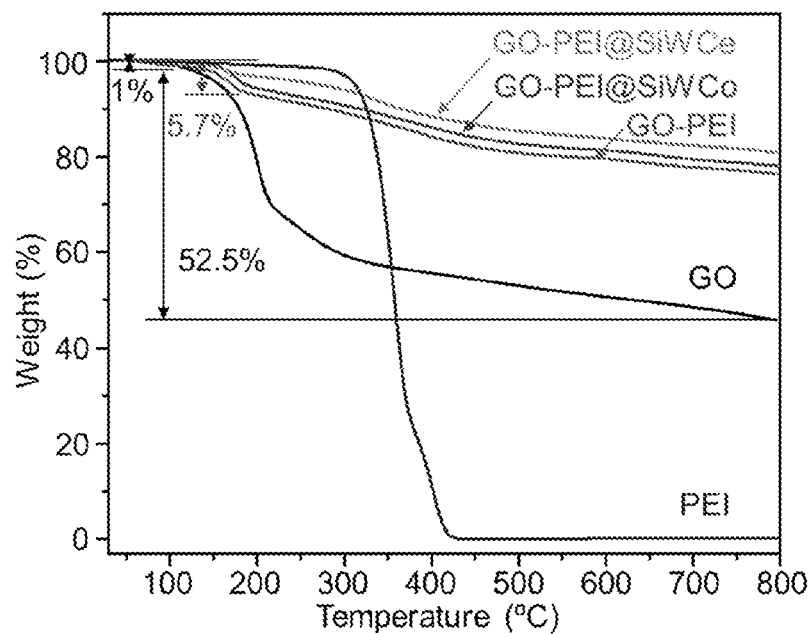
FIG. 18 shows TGA images of GO, GO-PEI, SiWCo@GO-PEI and SiWCe@GOPEI.

The thermal stability of POMs@GO-PEI is evaluated versus the temperature change of POMs@GO-PEI (FIG. 18). From the TGA curve, the mass loss of GO below 110° C. (about 1 wt %) is very small, which could be attributed to crystal water. This component becomes thermally unstable with increasing temperature and exhibits a large mass loss (52.5 wt %) between 110° C. and 800° C., which could be attributed to the removal of oxygen functional groups. Pure PEI experienced a sharp weight loss at 200° C., followed by two slower decomposition stages at 225° C. to

TABLE 3

ICP and organic element analysis of catalysts

| Sample | C (wt %) | H (wt %) | N (wt %) | Si (wt %) | W (wt %) | Co (wt %) | Ce (wt %) | K (wt %) | POM (wt %)[a] |
|---|---|---|---|---|---|---|---|---|---|
| SiWCo | — | — | — | 0.94 | 67.73 | 1.97 | — | 7.85 | — |
| SiWCo@GO-PEI | 18.27 | 3.028 | 4.01 | 0.60 | 43.15 | 1.26 | — | n.d. | 63.83 |
| SiWCe | — | — | — | 1.00 | 71.75 | — | 4.97 | — | — |
| SiWCe@GO-PEI | 19.83 | 3.154 | 4.38 | 0.68 | 44.28 | — | 1.48 | — | 68.00 |

[a]$POM_{loading}$ (wt %) = $Si_{POMs@GO-PEI}/Si_{POMs}$ where $Si_{POMs@GO-PEI}$ and $Si_{POM}$ represent the percentages of Si in POMs@GO-PEI and the POMs, respectively. Each set of data was measured 3 times to ensure repeatability.

By XPS spectroscopic analysis, the elemental composition and valence state of POM and GO-PEI after ion assembly shows (FIG. 9) that the peaks at 36, 53 and 400 eV are attributed to W4f, Si2p and N1s, while the peaks at 783, 883 and 903 eV are attributed to Co2p of SiWCo and Ce3d of SiWCe. After loading SiWCo and SiWCe, the contents of both C—O and O—C=O decrease (Table 4), indicative of the successful attaching of the clusters onto the GO-PEI carrier nanosheets. Meanwhile, the valence state of the metal elements in the formed catalyst remained at the highest valence state, which is consistent with the free state of POM clusters (FIG. 10).

TABLE 4

Figure 9:
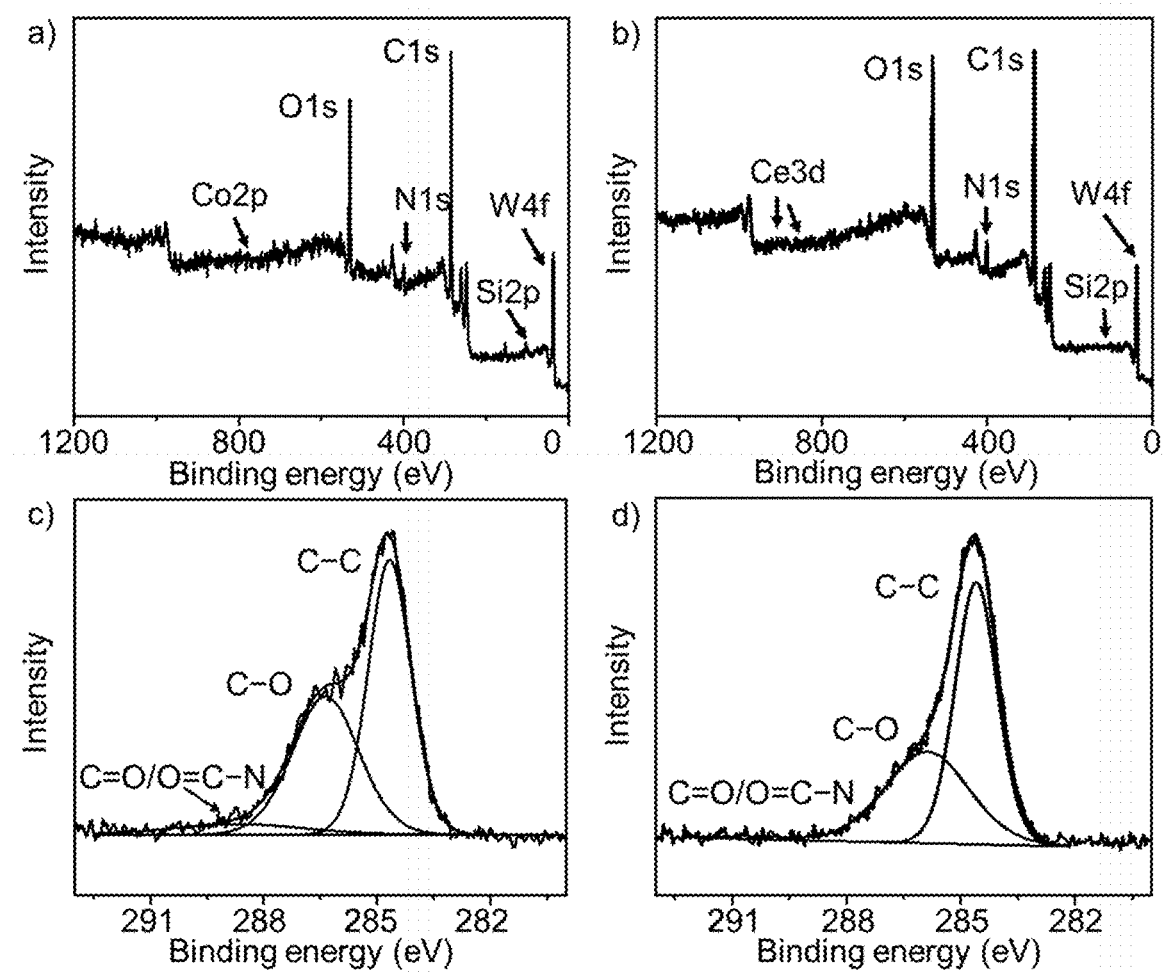
FIG. 9 shows XPS spectra and C1s spectra of SiWCo@GO-PEI and SiWCe@GOPEI, in which panel a) represents the XPS spectrum of SiWCo@GO-PEI, panel b) represents the XPS spectrum of SiWCe@GOPEI, panel c) represents the C1s spectrum of SiWCo@GO-PEI, and panel d) represents the C1s spectrum of SiWCe@GOPEI.
Figure 10:
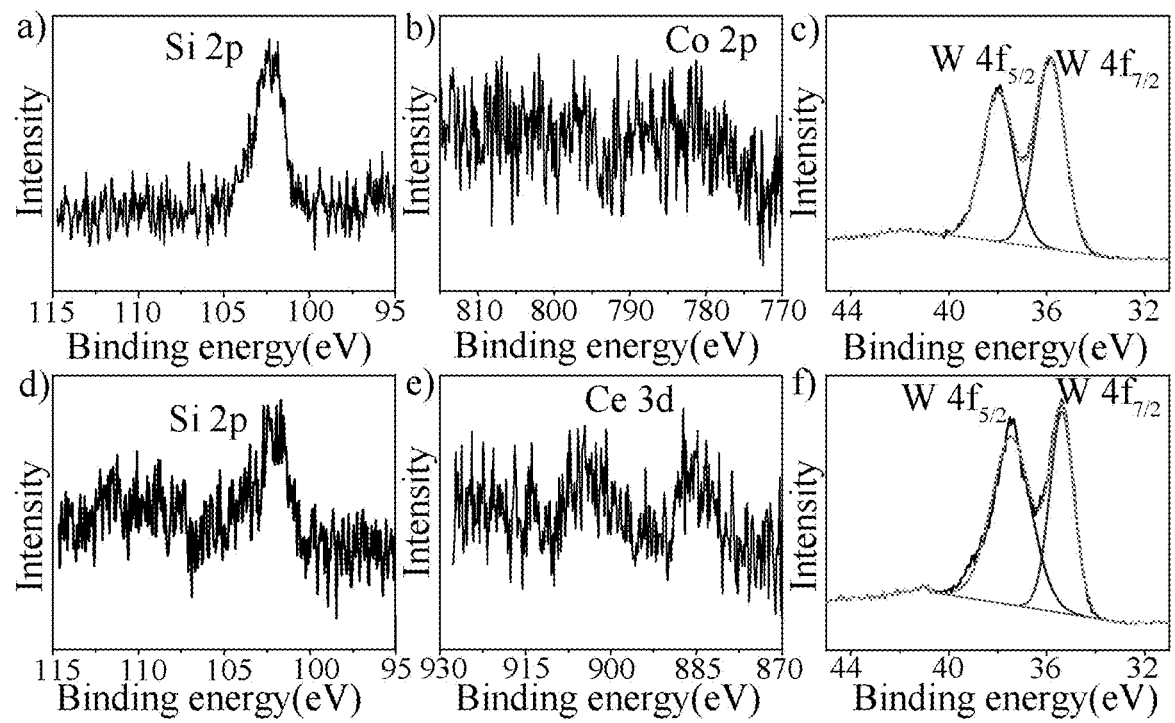
FIG. 10 shows that: panel (a) represents the XPS spectrum of Si2p of SiWCo@GO-PEI, panel (b) represents the XPS spectrum of Co2p of SiWCo@GO-PEI, panel (c) represents the XPS spectrum of W4f of SiWCo@GO-PEI, panel (d) represents the XPS spectrum of Si2p of SiWCe@GOPEI, panel (e) represents the XPS spectrum of Ce3d of SiWCe@GOPEI, and panel (f) represents the XPS spectrum of W4f of SiWCe@GOPEI.

Summary of content calculation for C = O, C—O and C—C in GO-PEI, SiWCo@GO-PEI and SiWCe@GOPEI from XPS spectra (number percentage) in FIG. 9.

| C1s | C = O (%) | C—O (%) | C—C (%) |
|---|---|---|---|
| GO-PEI | 6.78 | 29.89 | 63.33 |
| SiWCo@GO-PEI | 2.01 | 24.10 | 73.89 |
| SiWCe@GO-PEI | 1.57 | 23.60 | 74.83 |

Figure 11:
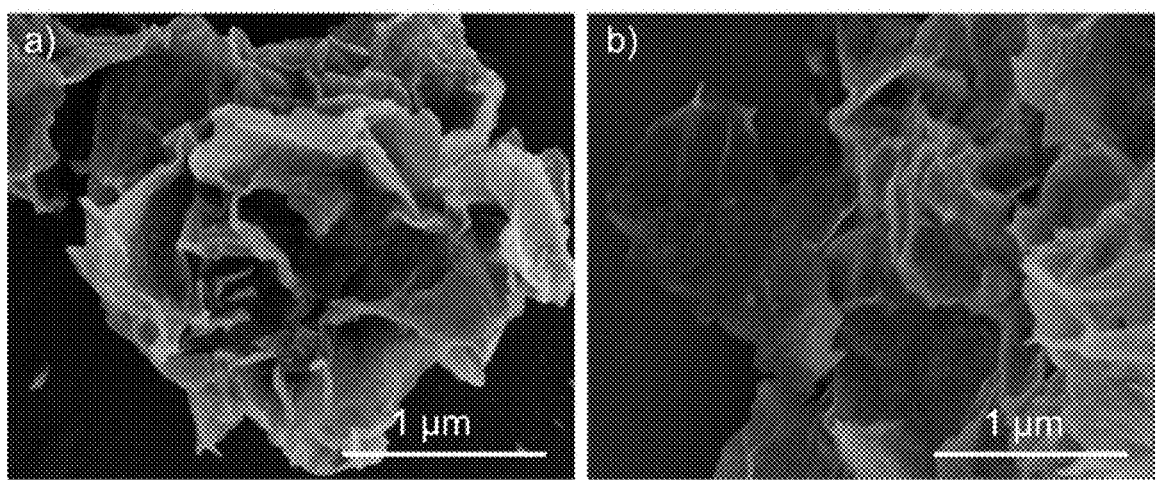
FIG. 11 shows SEM images of SiWCo@GO-PEI and SiWCe@GOPEI, in which panel a) represents SiWCo@GO-PEI and panel b) represents SiWCe@GOPEI.

The SEM image (FIG. 11) shows that the morphology of GO-PEI after the modification of POMs is basically the 372° C. and 372° C. to 430° C. After grafting PEI, the stability of GO is greatly improved. The weight loss of 5.7% in GO-PEI between 100° C. and 200° C. may be attributed to the loss of adsorbed water or $CO_2$ in PEI. The slow mass loss observed in the next two heating steps corresponds to the thermal decomposition of PEI and GO. Although SiWCe@GOPEI shows a similar trend to GO-PEI below 110° C., enhanced thermal stability is found after the temperature. Below 200° C., the mass loss of SiWCo@GO-PEI is a little more than that of SiWCe@GOPEI, but almost the same weight loss curve appears after the temperature. The reason is that the catalyst carries more water molecules during the preparation.

Photothermal Conversion of POMs@AGO-PEI Catalyst

Figure 19:
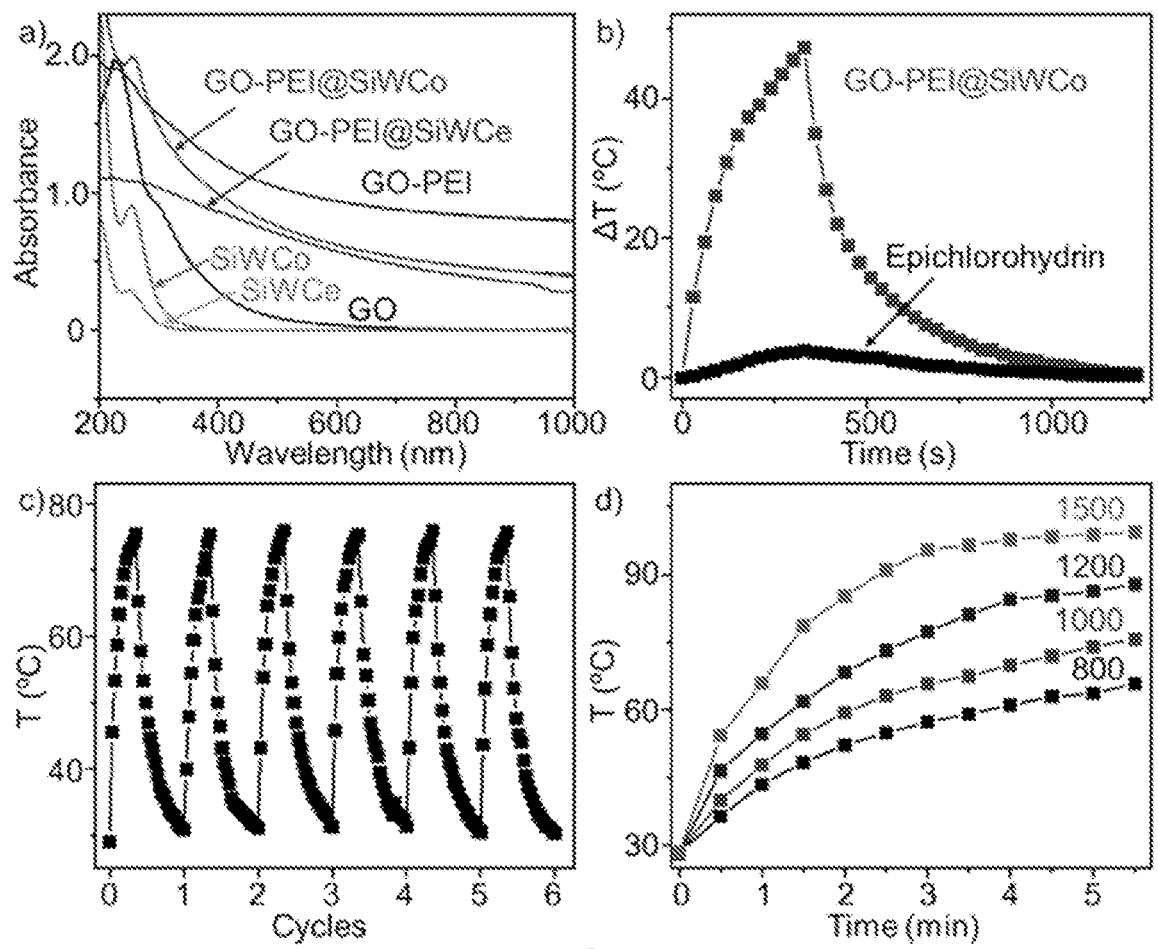
FIG. 19 shows that: panel a) represents UV-vis-NIR spectra of GO, POMs, GO-PEI carrier and POMs@GO-PEI dispersed in water; panel b) represents temperature change of 5.0 $mg·mL^{-1}$ of SiWCo@GO-PEI dispersion in epichlorohydrin and pure epichlorohydrin under NIR illumination at 808 nm and 1000 $mW·cm^{-2}$; panel c) represents temperature cycle curves of SiWCo@GO-PEI dispersion in epichlorohydrin under NIR light irradiation; and panel d) represents temperature cycle curves of SiWCo@GO-PEI in epichlorohydrin (5.0 $mg·mL^{-1}$) under illumination at different power densities (800, 1000, 1200 and 1500 $mW·cm^{-2}$).
Figure 20:
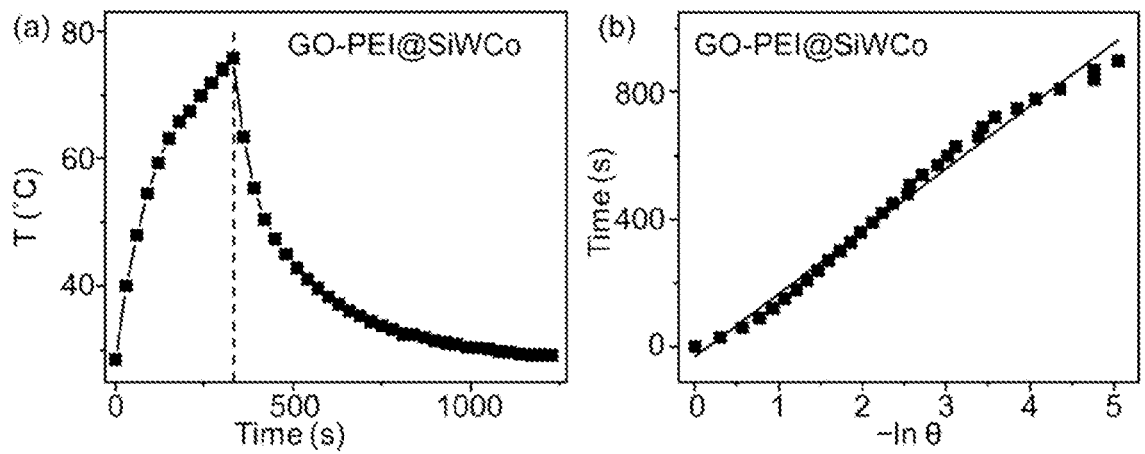
FIG. 20 shows that: panel (a) represents temperature changes of SiWCo@GO-PEI dispersion in epichlorohydrin versus the light switching on and off, and panel (b) represents a corresponding plot of irradiation time versus $-\ln\theta$ values obtained during the temperature drop of the dispersion after switching off a light source in panel (a).
Figure 21:
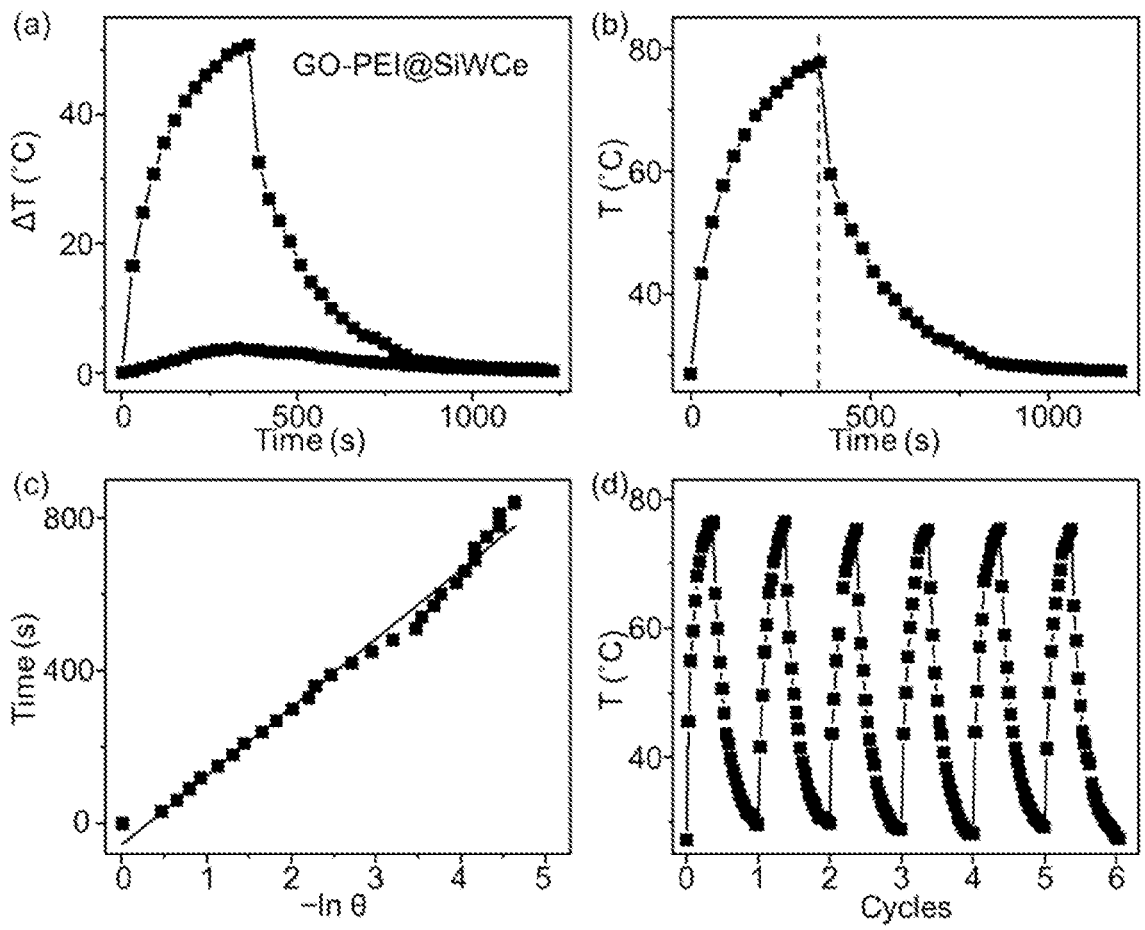
FIG. 21 shows that: panel (a) represents a temperature difference change of 7 $mg·mL^{-1}$ of SiWCe@GO-PEI dispersion in epichlorohydrin and pure epichlorohydrin versus the NIR light switching on and off at 808 nm and 1000 $mW·cm^{-2}$; panel (b) represents a temperature change of 7 $mg·mL^{-1}$ of SiWCe@GOPEI dispersion in epichlorohydrin versus the NIR light switching on and off at 808 nm and 1000 $mW·cm^{-2}$; panel (c) represents a corresponding plot of irradiation time versus the $-\ln\theta$ value obtained during the temperature drop of the dispersion after switching off a light source in panel (b); and panel (d) represents a temperature cycling curve of 7 $mg·mL^{-1}$ of SiWCe@GO-PEI dispersion in epichlorohydrin under different power densities (800, 1000, 1200 and 1500 $mW·cm^{-2}$).

The efficient conversion of NIR light energy remains a major barrier in photothermal catalysis experiments. GO in the oxidized state has two distinct absorption bands at 229 nm and 297 nm corresponding to the C=C and C=O bonds (a) in FIG. 19). The oxygen-containing functional groups of the initial GO are partially reduced after the reaction with PEI, and the absorption band of the formed GO-PEI is shifted to the NIR region. The conjugation caused the absorption to shift to the NIR wavelength range. Then the Photothermal conversion efficiency of the SiWCo@GO-PEI suspension in epichlorohydrin is evaluated by a NIR light source of 808 nm 1000 mW $cm^{-2}$. The relationship between photothermal conversion efficiency (η) and temperature increase (ΔT) was evaluated by exposing the solution to light to reach a steady-state (FIG. 19, b)). The values of η=59.64% and ΔT=46.9° C. were extracted from the thermal curve, and the detailed derivation is shown in FIG. 20. No significant change in photothermal conversion efficiency is observed after six cycles, indicating sustainable photothermal stability (FIG. 19, c)). With the increase in laser intensity, the temperature of the sample solution rises accordingly (d) in FIG. 19), indicating that the reaction temperature may be adjusted. Similarly, the photothermal conversion of SiWCe@GOPEI is also characterized by the same method, and its η is 66.85% with a ΔT value of 51.9° C. (FIG. 21, (a) to (c)). The photothermal efficiency remains almost within over six cycles (FIG. 21, (d)).

NIR Photothermal Enhanced Catalysis

By taking the cycloaddition model reaction of $CO_2$ and epichlorohydrin as an example, the experimental conditions are conducted in a solvent-free state with the assistance of the cocatalyst tetrabutyl ammonium bromide (TBA·Br) at room temperature and pressure. By taking SiWCo@GO-PEI as an example, the catalytic reactions are conducted under a series of conditions, including changing additives and temperature, with or without NIR radiation. The results are summarized in Table 5. In the absence of any additives, few addition products (yields ≤about 10%) are detected whether the reaction proceeds with or without NIR laser-light radiation (Table 5, entries 1-3). In contrast to this, the composite catalyst exhibits excellent catalytic activity under the NIR photothermal condition at ca. 1.0 atm. The corresponding product cyclocarbonate is obtained in 98.87% conversion and very high selectivity within only 4 h (≥99%) (Table 5, entry 4). Notably, the TOF values up to 2718 $h^{-1}$ under this mild reaction conditions (Table 6) is superior to all of the published results. The temperature of the reaction solution is 75° C., implying that the temperature increase derives from the photothermal conversion, since the temperature of the solution has no obvious change occurs in the absence of NIR laser radiation and SiWCo@GO-PEI catalyst. When other conditions remain unchanged, when the laser is removed and is replaced with an ordinary oil bath, the conversion rate reduced largely to 70.8% with a TOF value of 1946 $h^{-1}$ at 75° C., in contrast to only 17.3% with a TOF of only 477 $h^{-1}$ at room temperature (Table 5, entries 5 to 6). The catalytic activity of individual components in the catalysts is evaluated separately at room temperature by ordinary heating and NIR photothermal conversion. Although GO and PEI as well as GO-PEI carrier show a certain enhancement of catalytic activity (Table 5, entries 7 to 15), the conversions still did not exceed 40%, implying that they are not catalytic centers. In the presence of SiWCo alone, however, the conversion reaches up to ca. 46.4% under the heating condition, which mean that clusters plays a significant role in the catalytic components. Meanwhile, only 18.2% conversion occurs under the light irradiation, which reveals the importance of the photothermal component (Table 5, entries 16 to 18). When the mixture of PEI and SiWCo is used, the conversion reaches up to 66.5% under external heating. Since 20% conversion increase with respect to SiWCo alone is observed, the presence of PEI is evidently helpful for the cluster's catalysis. Due to lacking a photothermal center, the conversion becomes 31.1% under photothermal conditions (Table 5, entries 19 to 21). On the other hand, when the mixture of SiWCo and GO is used as the catalyst, the catalytic conversion becomes higher than that under external heating condition again due to the combined photothermal effect (Table 5, entries 22 to 24). Yet, the conversion value is still much lower than that of the SiWCo@GO-PEI catalyst due to the lack of $CO_2$ capture agent. From this result, it can be concluded that GO plays the role of a local in-situ heater for promoting the conversion and selectivity of cycloaddition products. PEI helps in the adsorption of $CO_2$. Formula 1 is a reaction principle formula of $CO_2$ cycloaddition catalysis:

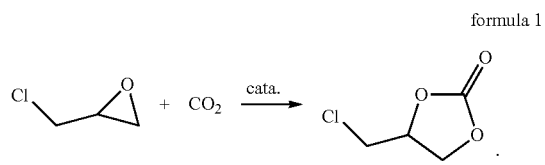

formula 1

TABLE 5

Summary of catalytic performance of $CO_2$ cycloaddition under various reaction conditions[a]

| Entry | Additives | Condition[c] | Con. (%) [d] | Time (h) | Selec. (%) |
|---|---|---|---|---|---|
| 1 | | Photothermal | 5.1 | 4 | >99 |
| 2 | Blank | Ex. Heating 75° C. | 10.5 | 4 | >99 |
| 3 | | R.T. | 3.7 | 4 | >99 |
| 4 | | Photothermal | 98.9 | 4 | >99 |
| 5 | SiWCo@GO-PEI | Ex. heating 75° C. | 70.8 | 4 | >99 |
| 6 | | R.T. | 17.3 | 4 | >99 |
| 7 | | Photothermal | 16.1 | 4 | >99 |
| 8 | GO | Ex. heating 75° C. | 10.1 | 4 | >99 |
| 9 | | R.T. | 5.3 | 4 | >99 |
| 10 | PEI | Photothermal | 8.1 | 4 | >99 |
| 11 | | Ex. heating 75° C. | 12.1 | 4 | >99 |
| 12 | | R.T. | 4.3 | 4 | >99 |
| 13 | | Photothermal | 39.9 | 4 | >99 |
| 14 | GO-PEI | Ex. heating 75° C. | 30.6 | 4 | >99 |
| 15 | | R.T. | 8.7 | 4 | >99 |
| 16 | | Photothermal | 18.2 | 4 | >99 |
| 17 | SiWCo | Ex. heating 75° C. | 46.4 | 4 | >99 |
| 18 | | R.T. | 11.2 | 4 | >99 |
| 19 | | Photothermal | 31.1 | 4 | >99 |
| 20 | PEI/SiWCo | Ex. heating 75° C. | 66.5 | 4 | >99 |
| 21 | | R.T. | 15.9 | 4 | >99 |
| 22 | | Photothermal | 76.4 | 4 | >99 |
| 23 | GO/SiWCo | Ex. heating 75° C. | 60.6 | 4 | >99 |
| 24 | | R.T. | 14.6 | 4 | >99 |
| 25 | | Photothermal | 92.1 | 4.5 | >99 |
| 26 | SiWCe@GO-PEI[b] | Ex. heating 75° C. | 76.3 | 4.5 | >99 |
| 27 | | R.T. | 16.0 | 4.5 | >99 |
| 28 | | Photothermal | 58.5 | 4 | >99 |
| 29 | $SiW_{12}$@GO-PEI | Ex. heating 75° C. | 42.2 | 4 | >99 |
| 30 | | R.T. | 10.1 | 4 | >99 |

[a]Reaction conditions: epichlorohydrin (2.0 mL, 25.51 mmol), catalyst (10.0 mg, 2.32 × $10^{-3}$ mmol based on SiWCo), $CO_2$ balloon, co-catalyst TBA•Br (1.0 mM);
[b]SiWCo@GO-PEI (14.0 mg, 3.31 × $10^{-3}$ mmol based on SiWCe), reaction time 4.5 h;
[c]"Photothermal (PT) condition" means that the reaction is conducted under NIR light radiation (808 nm laser, 1000 mW $cm^{-2}$), "External (Ex.) heating" and "room temperature (R.T.)" represent that the reaction was carried out at 75° C. in an oil bath and room temperature (ca. 25° C.), respectively. All of the control reactions were performed in the dark to ensure that NIR light was the only light source;
[d]conversion and yield were calculated by NMR.

TABLE 6

Activity stability during catalytic use of POMs@GO-PEI estimated by TOF value[a]

| TOF($h^{-1}$) [a] | P.T. | Ex. Heating 75° C. | R.T. |
|---|---|---|---|
| SiWCo@GO-PEI | 2718 | 1946 | 477 |
| SiWCe@GO-PEI | 1582 | 1311 | 275 |

TOF = mol epoxide/mol main active catalyst × time, referred to a molar amount of substrate converted per mole of active catalytic component per unit time.

Figure 22:
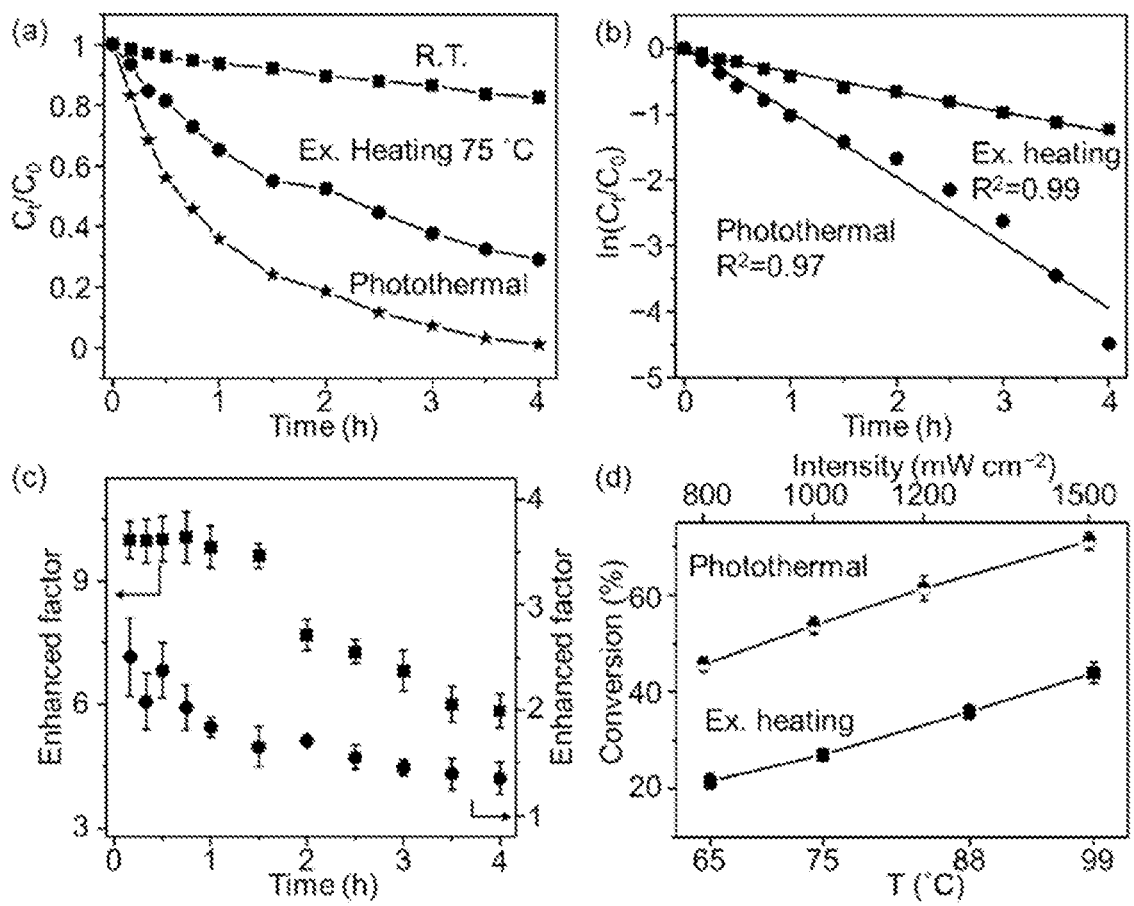
FIG. 22 shows that: panel (a) represents rate-time plots of SiWCo@GO-PEI catalyzing $CO_2$ and epichlorohydrin under room temperature (R.T.), external heating (Ex. heating) and photothermal (P.T.) conditions; panel (b) represents corresponding kinetic plots under Ex. heating and NIR radiation; panel (c) represents the enhanced factor plots versus the reaction time, calculated by dividing the conversion rate following NIR radiation by that following external heating to 75° C. and R.T., respectively; and panel (d) represents the conversion rate (at 0.75 h) versus different reaction temperatures and different NIR light intensities.

The change of the reaction rate curve $C_t/C_0$ with time is shown in (a) in FIG. 22, where $C_0$ and $C_t$ represent the concentration of the substrate epichlorohydrin at the beginning and at moment t. The reaction rate under NIR radiation is much higher than that of external heating at the same measured temperature. In principle, the external heating encounters a heat diffusion via successive collisions of solvent molecules to arrive at the catalytic center. In contrast, the GO carrier directly transfers the heat sourcing from photothermal conversion to the substrate molecules adsorbing on POM and PEI through remote radiation control. Therefore, the NIR photothermal effect is more favorable for accelerating the reaction of cycloaddition of $CO_2$. The reaction kinetics behaviors under the photothermal condition and external heating in the presence of SiWCo@GO-PEI are shown in (b) in FIG. 22. According to the kinetic equation, $\ln(C/C_0)=-kt$, the reaction follows a pseudo-first-order kinetics, and the kinetic constant is calculated to be $k=1.0\ h^{-1}$ under NIR radiation, more than three times under external heating ($0.3\ h^{-1}$). The enhancement factors of photothermal catalysis at different times are shown in (c) in FIG. 22, obtained by dividing the conversion rates under the photothermal condition by those at room temperature and under external heating to 75° C. The results show that the introduction of the photothermal effect enhances the reaction by 6.0-10.5-fold, accompanied by 1.3-2.6-fold local enhancement sourcing from the high local temperature on the GO surface. Therefore, the photothermal effect of GO in SiWCo@GO-PEI not only establishes a higher temperature field near the catalytic site but also contributes to the activation of substrate molecules. The catalytic performance of SiWCo@GO-PEI under different NIR light intensities is evaluated (FIG. 22, (d)). The reaction conversion is almost linearly dependent on the light intensity, which is also parallel to the situation upon external heating. The results clearly illustrate that the observed conversion of the cycloaddition upon NIR radiation with a laser intensity of 1000 mW cm$^{-2}$ is higher than the reaction carried out at 99° C. by external heating, further revealing that the photothermal conversion effect promotion of the catalytic activity.

The photothermal catalytic performance of SiWCo@GO-PEI for various epoxides under NIR light irradiation is investigated (Table 7). When an epoxide substrate 2-(phenoxymethyl)oxirane is substituted with a phenoxy group, the corresponding carbonate is selective to form in the yield of 92.3% (Table 7, entry 1). This is because the increased size of the substituents group is not conducive to Br-nucleophilic attack epoxide for ring-opening. When styreneoxide with a substituted phenyl group (Table 7, entry 2) is used for the reaction, the yield of the formed cyclic carbonate decreases to 88.9%, further indicative of the steric blocking effect for the cycloaddition reaction. Such steric blocking is also found in the cycloaddition of cyclohexene oxide, in which a yield of 63.4% product is detected under the same conditions (Table 7, entry 3). As a comparison, propylene oxide without any additional substitution effect leads to a conversion of 96.8% due to a lack of steric hindrance (Table 7, entry 4). The slightly reduced conversion value with respect to the cycloaddition of propylene oxide may be due to the deviation of the experimental for a solvent-free reaction and volatilization due to its lower boiling point. At ambient temperature and atmospheric pressure, NIR photothermally-catalyzed $CO_2$ cycloaddition with yields and selectivities was comparable to those of reactions at higher temperatures and high pressure.

TABLE 7

Results of $CO_2$ cycloaddition with different substrates[a]

| Entry | Epoxides | Product | Con. (%)[b] | Time (h) | Selec. (%)[c] |
|---|---|---|---|---|---|
| 1 | (phenoxymethyl)oxirane | corresponding cyclic carbonate | 92.3 | 4 | >99 |
| 2 | styrene oxide | corresponding cyclic carbonate | 88.9 | 4 | >99 |
| 3 | cyclohexene oxide | corresponding cyclic carbonate | 63.4 | 4 | >99 |
| 4 | propylene oxide | propylene carbonate | 96.8 | 4 | >99 |

[a]Reaction conditions: epoxide (2.0 mL), catalyst (14.00 mg, 2.32 × 10$^{-3}$ mmol calculated as SiWCo), $CO_2$ balloon, TBA•Br (1.0 mM); all reactions were conducted under NIR;
[b, c]conversions and selectivities were calculated by NMR.

Figure 23:
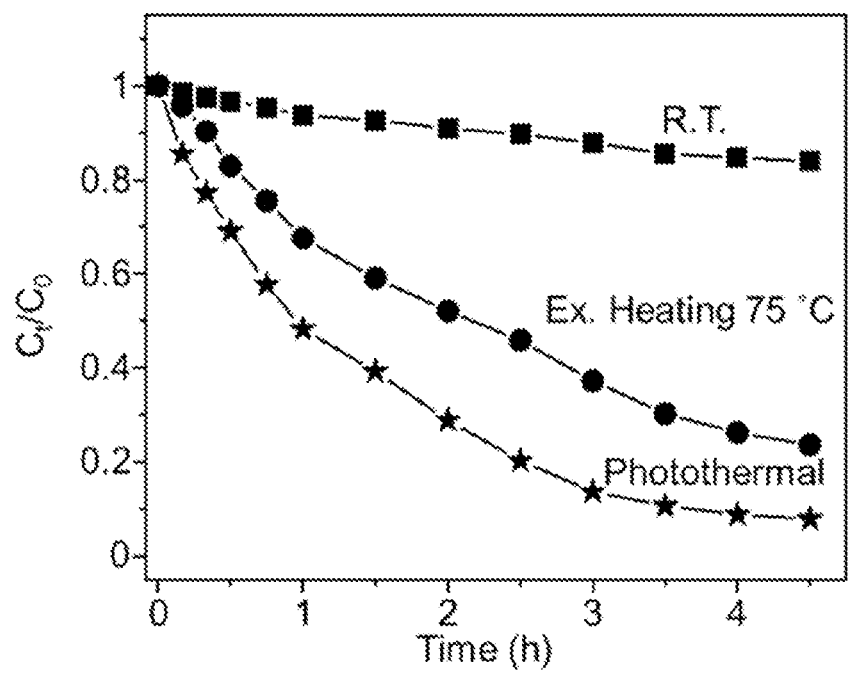
FIG. 23 shows rate-time plots of SiWCe@GO-PEI catalyzing $CO_2$ and epichlorohydrin under room temperature (R.T.), external heating (Ex. heating) and photothermal conditions.
Figure 24:
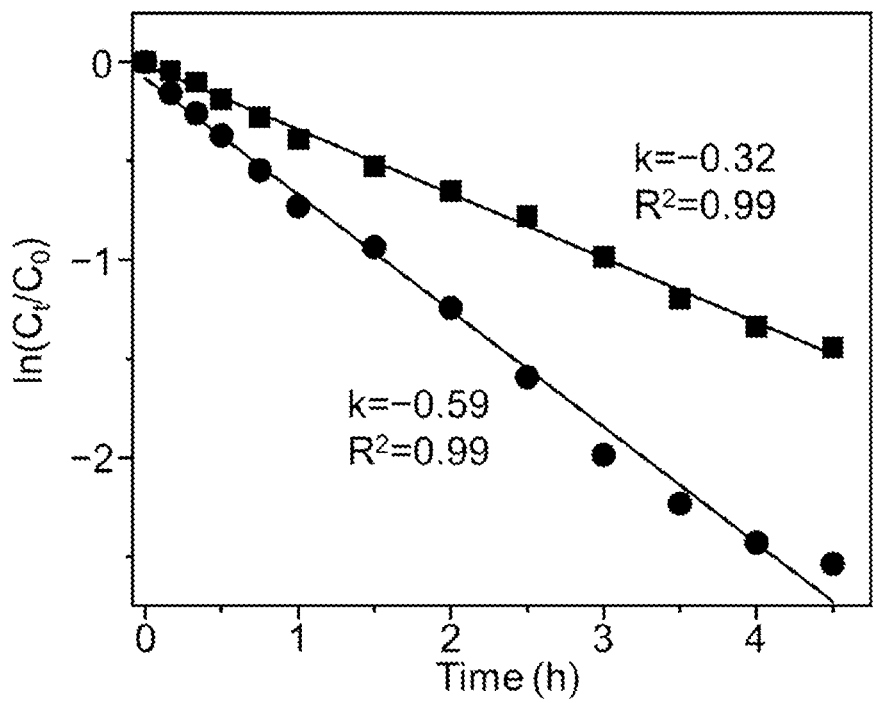
FIG. 24 shows corresponding kinetic plots of SiWCe@GO-PEI catalyzing $CO_2$ and epichlorohydrin under Ex. heating and NIR radiation.
Figure 25:
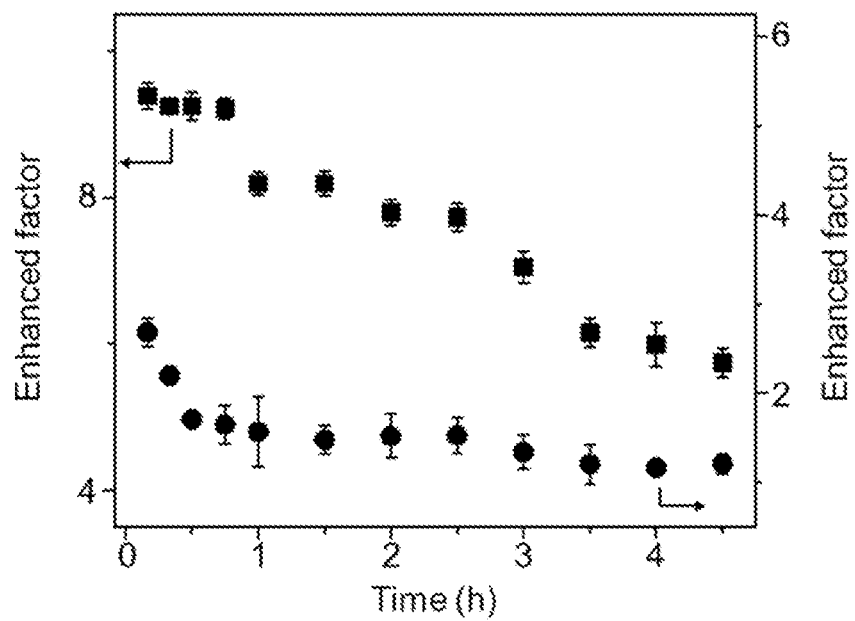
FIG. 25 shows the enhanced factor plots of SiWCe@GO-PEI catalyzing $CO_2$ and epichlorohydrin versus the reaction time.

The catalytic performance of SiWCe@GO-PEI is explored with and without NIR laser irradiation. The cycloaddition yield for epichlorohydrin also reaches 92.1% within 4.5 h with a TOF value of 1582 h$^{-1}$ under NIR laser irradiation, in comparison to only 76.3% (1311 h$^{-1}$) and 16.0% (275 h$^{-1}$) under the external heating condition and ambient temperature, respectively (Table 5, entries 25 to 27). It can be seen that the reaction rate under NIR radiation is still much higher than the one by external heating (FIG. 23), indicating that the NIR photothermal conversion effect enhanced the catalytic conversion. The reaction catalyzed by SiWCe@GO-PEI also follows the pseudo-first-order kinetic process with k=0.59 h$^{-1}$, while the value is 0.32 h$^{-1}$ 75° C. via external heating (FIG. 24). Based on the conversion rate at room temperature, the NIR photothermal enhanced factor is calculated to be about 5-10-fold (FIG. 25). The conversion over SiWCe@GO-PEI is slightly lower than over SiWCo@GO-PEI, because the electronegativity of Ce is smaller than that of Co, which provides a weaker acidic as a catalytic center. As indirect evidence, the catalyst SiW$_{12}$@GO-PEI is used, in which the [SiW$_{12}$O$_{40}$]$^{4-}$ (SiW$_{12}$) cluster is used instead of POMs with Lewis acid metals to catalyze the cycloaddition reaction. As a result, the yields under different conditions are greatly decreased (Table 5, entries 28 to 30), further demonstrating the critical role of transition-metal Co and Ce in serving as the Lewis acid.

Stability of Catalysts in Recycling Use

Figure 26:
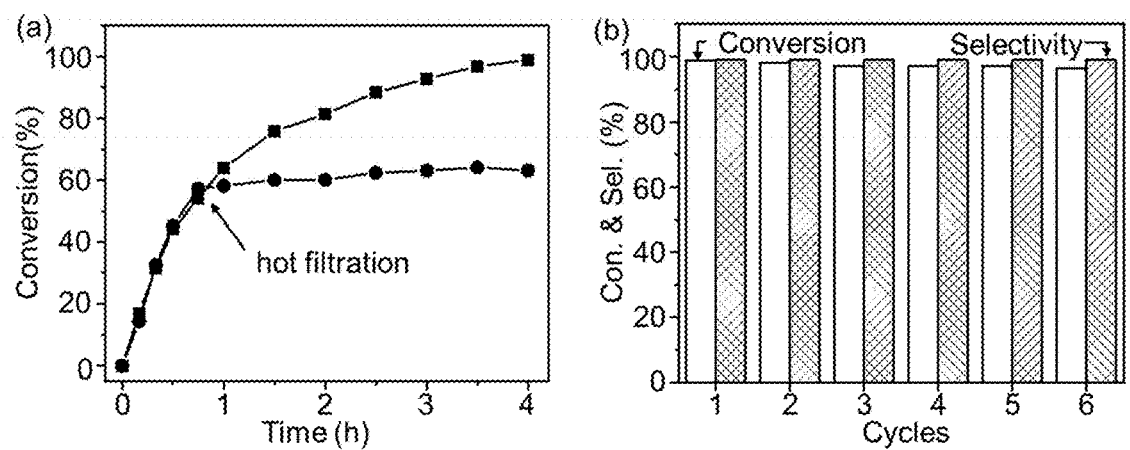
FIG. 26 shows that: panel (a) represents a thermal filtration experiment of SiWCo@GO-PEI photothermal catalyzing $CO_2$ and epichlorohydrin, and panel b) represents a photothermal catalytic cycle recovery diagram.

When the photothermal catalytic conversion rate reaches 50%, once the SiWCo@GO-PEI catalyst is filtered out, the reaction suspends quickly (FIG. 26 (a)), nor does the same reaction even at 75° C. by external heating. Almost no metal elements are detected from the filtrate detected by ICP. The results show that the prepared composite catalysts act as real heterogeneous catalysts.

Figure 27:
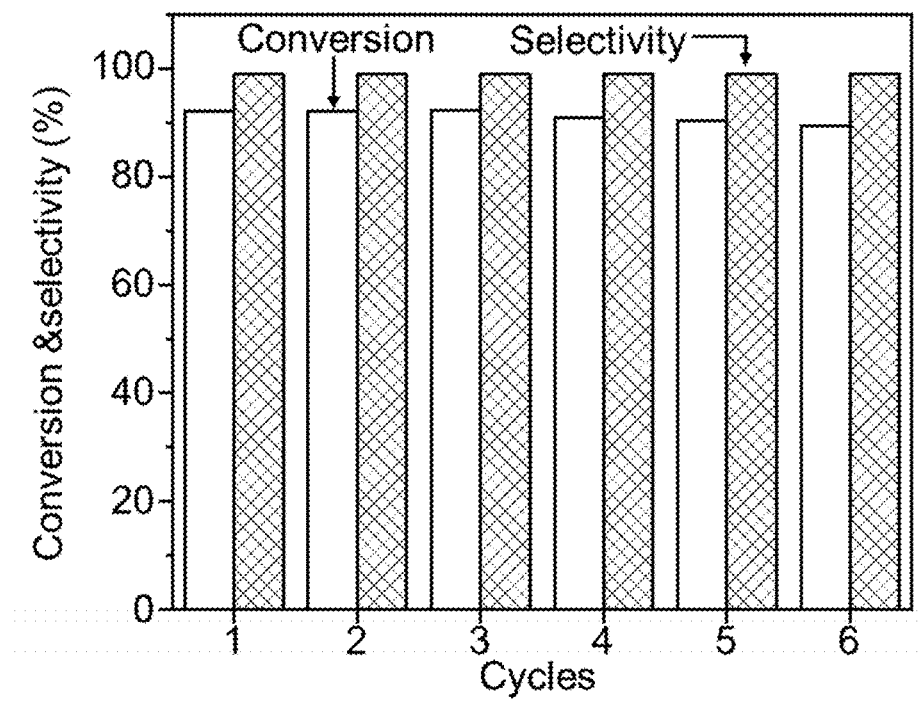
FIG. 27 shows a photothermal catalytic cycle recovery diagram of SiWCo@GO-PEI photothermal catalyzing $CO_2$ and epichlorohydrin.

To demonstrate the activity and sustainability of the catalyst, recyclability experiments are carried out. SiWCo@GO-PEI and SiWCe@GO-PEI still achieve conversion rates of 96% and 89% and TOF values as high as 2648 h$^{-1}$ and 1512 h$^{-1}$ after six cycles ((b) in FIG. 26, FIG. 27 and Table 8), which demonstrates the catalytic activity and sustainability under the reaction conditions.

TABLE 8

Reusability of POMs@GO-PEI in reaction cycles by TOF assessment$^a$

| TOF(h$^{-1}$)$^a$ | 1$^{st}$ | 2$^{nd}$ | 3$^{rd}$ | 4$^{th}$ | 5$^{th}$ | 6$^{th}$ |
|---|---|---|---|---|---|---|
| SiWCo@GO-PEI | 2694 | 2698 | 2673 | 2673 | 2673 | 2648 |
| SiWCe@GO-PEI | 1563 | 1580 | 1563 | 1553 | 1534 | 1512 |

$^a$TOF = mol epoxide/mol main active catalyst × time, referred to the molar amount of substrate converted per mole of active catalytic component per unit time.

Figure 28:
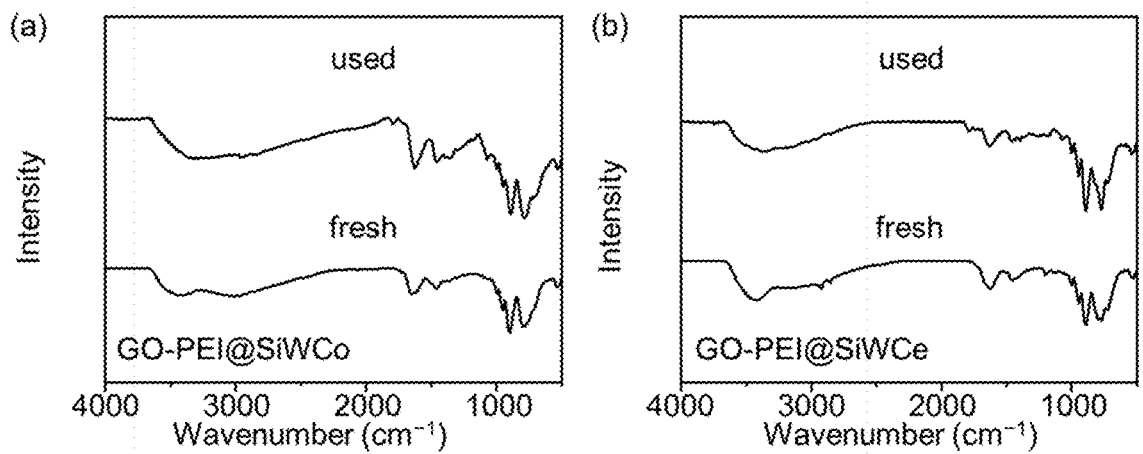
FIG. 28 shows infrared spectra of panel (a) SiWCo@GO-PEI and panel (b) SiWCe@GOPEI catalysts before and after recovery.
Figure 29:
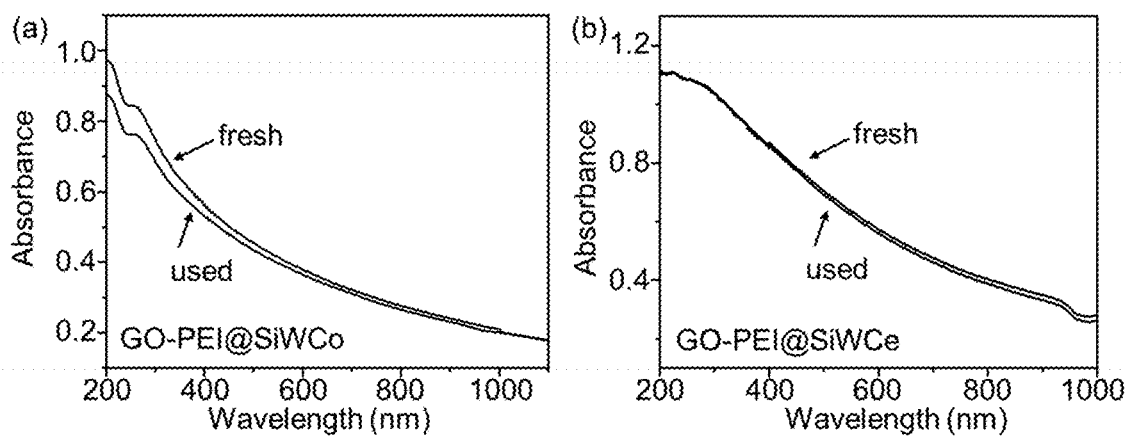
FIG. 29 shows UV-vis-NIR spectra of panel (a) SiWCo@GO-PEI and panel (b) SiWCe@GOPEI catalysts before and after recovery.
Figure 30:
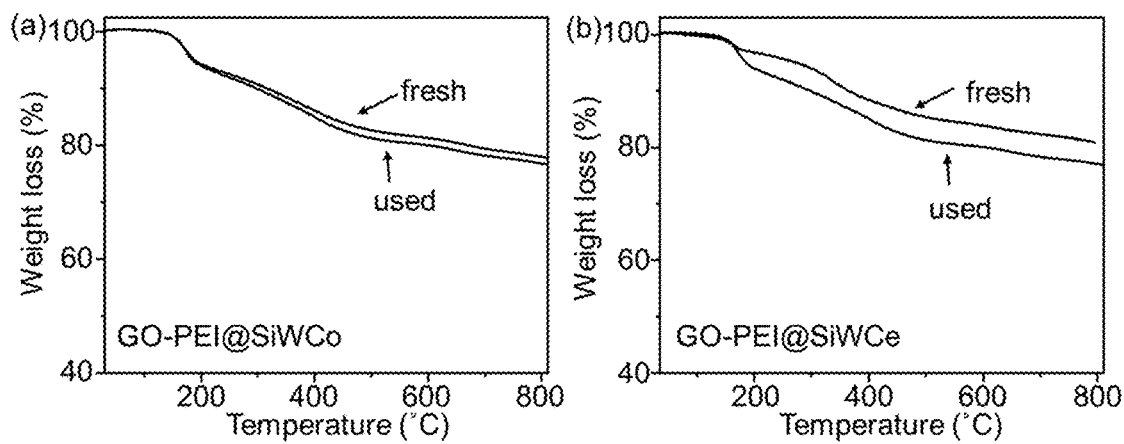
FIG. 30 shows TGA plots of panel (a) SiWCo@GO-PEI and panel (b) SiWCe@GOPEI catalysts before and after recovery.
Figure 31:
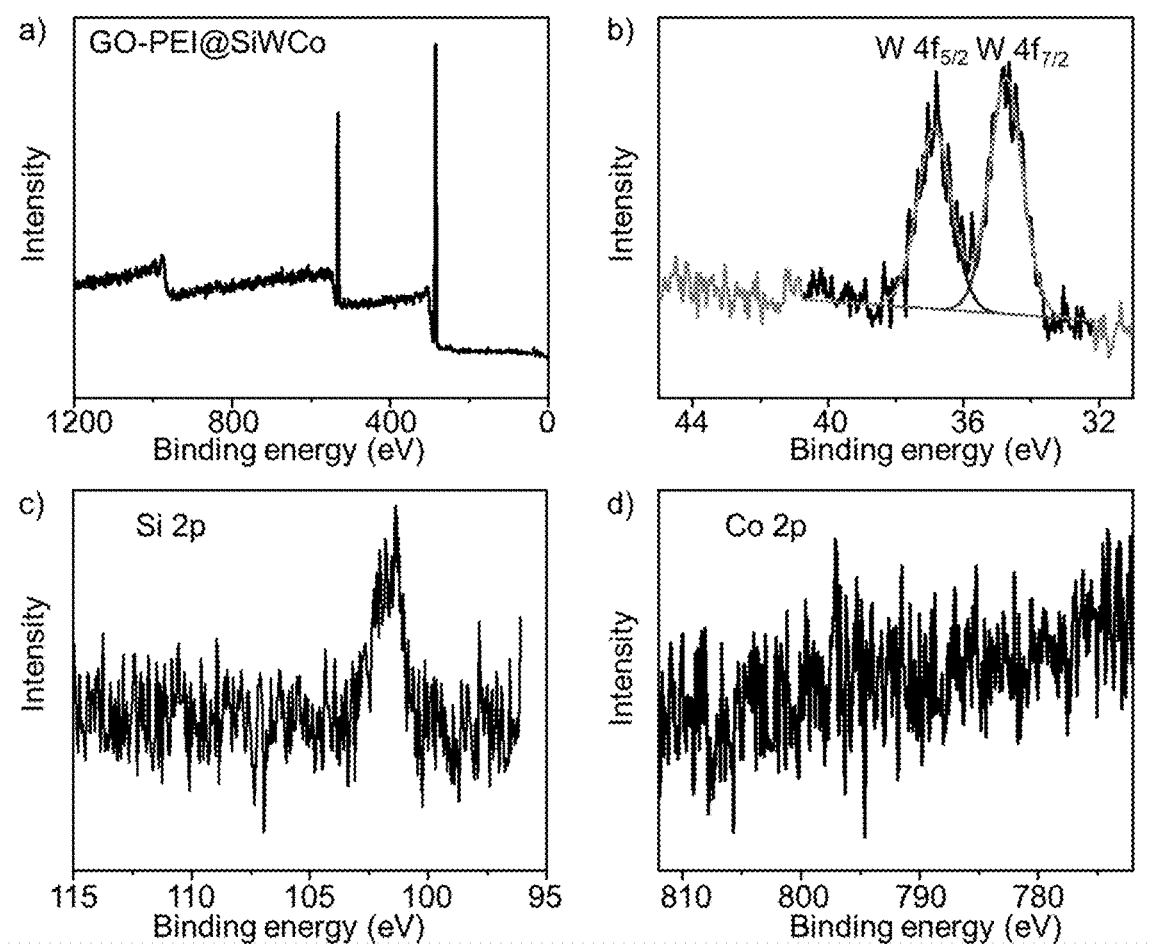
FIG. 31 shows XPS spectra of SiWCo@GO-PEI after recycling, in which panel (a) represents a full spectrum; panel (b) represents a W4f spectrum; panel (c) represents an Si2p spectrum; and panel (d) represents a Co2p spectrum.
Figure 32:
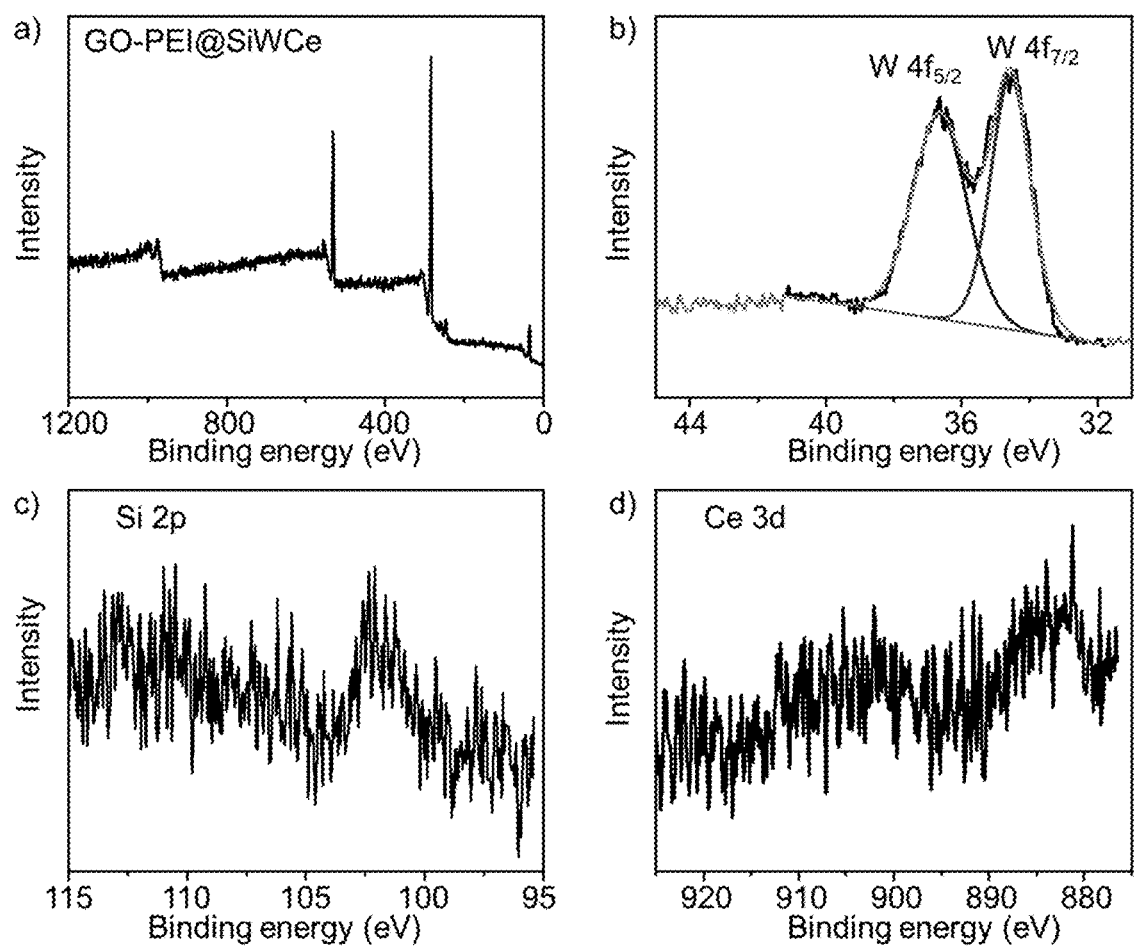
FIG. 32 shows XPS spectra of SiWCe@GOPEI after recycling, in which panel (a) represents a full spectrum; panel (b) represents a W4f spectrum; panel (c) represents an Si2p spectrum; and panel (d) is a Ce3d spectrum.

The FT-IR and UV-vis spectra of the used catalysts are compared with the fresh ones (FIG. 28 and FIG. 29). The consistent absorption bands illustrate that the cluster structures of POMs remain unchanged during the reaction cycle. The TG curves of both used catalysts show almost no obvious weight loss compared to the fresh ones (FIG. 30). The XPS analysis gives the unchanged metal valence state of POMs before and after catalytic reactions (FIG. 31 and FIG. 32). The ICP and organic elemental analyses are coincident with the fresh ones, suggesting that the used catalysts have little decomposition in terms of the chemical compositions (Tables 9 and 10).

TABLE 9

ICP and organic element analysis results of SiWCo@GO-PEI before and after recycling

| SiWCo@GO-PEI | C (wt %) | H (wt %) | N (wt %) | Si (wt %) | W (wt %) | Co (wt %) |
|---|---|---|---|---|---|---|
| Fresh catalyst | 18.27 | 3.028 | 4.01 | 0.60 | 43.15 | 1.26 |
| After 6 cycles | 17.92 | 3.283 | 4.23 | 0.57 | 42.81 | 1.23 |

TABLE 10

ICP and organic element analysis results of SiWCe@GO-PEI before and after recycling

| SiWCe@GO-PEI | C (wt %) | H (wt %) | N (wt %) | Si (wt %) | W (wt %) | Ce (wt %) |
|---|---|---|---|---|---|---|
| Fresh catalyst | 19.83 | 3.154 | 4.38 | 0.68 | 44.28 | 1.48 |
| After 6 cycles | 20.17 | 3.344 | 4.59 | 0.53 | 43.91 | 1.26 |

Photothermal Catalytic Mechanism

Figure 33:
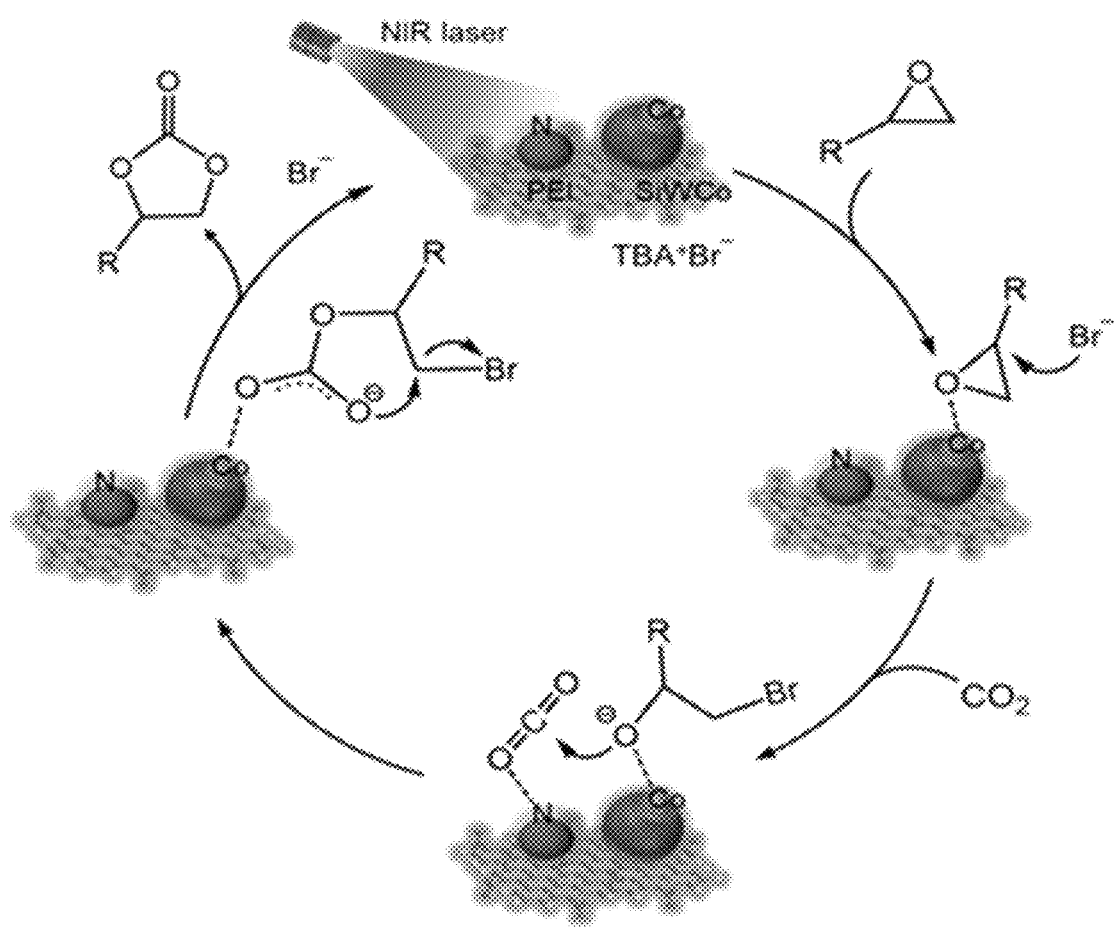
FIG. 33 shows a possible pathway diagram of the photothermal catalysis of $CO_2$ cycloaddition reaction by SiWCo@GO-PEI with the assistance of a co-catalyst.

In contrast to normal external heating, NIR photothermal-enhanced CO$_2$ cycloaddition with epoxides includes some additional aspects in understanding the catalytic mechanism, although the reaction process has been well investigated. As has been demonstrated, the partially reduced GO only acts as an agent for NIR photothermal transformation to raise the local temperature and itself does not catalyze the reaction. Therefore, the reaction process can be deduced to originate mainly from the synergistic catalysis of PEI and POM components. According to the accepted model, the CO$_2$ cycloaddition reaction should be activated by its adsorption on the PEI component, while the epoxides are activated by the coordination and the electron-deficient Lewis acidic Co/Ce center via an oxygen atom. That is, the Br$^-$ from the cocatalyst TBA·Br attacks the less sterically hindered C—O in the epoxide, and then the ring-opening. Followed by, the adsorbed $CO_2$ and O atoms interact and intercalate, and are finally converted to the corresponding cyclic carbonates through the ring-closure step and the exit of the bromide. After this cycle, the catalytic center recovers to its original free state (FIG. 33). Since the cycloaddition reaction involves three phases, a solid catalyst, an immiscible epoxide liquid and a gaseous substrate, a veritable understanding of the real mechanism seem very difficult. At present, it is clear that the critical steps rely on the anchoring of epoxide substrates and the capture of $CO_2$ closing to the catalytic center. The former process can be realized through optimizing the dispersion and acidity of the POMs, especially through increasing the local temperature to promote the coordination of organic epoxides. Since PEI could also accommodate POM as a Lewis base, the catalytic reaction with surrounding $CO_2$ could be efficiently conducted. During the process, the partially reduced GO matrix has a key influence on the in-situ photothermal heater upon NIR laser irradiation, and delivers heat directly to the epoxide adsorbing on the POM surface and $CO_2$ on PEI. Therefore, the high temperature environment close to the catalyst surface enhanced the reactions.

In the present disclosure, by covalently grafting branched polymer PEI onto the surface of GO through the amidation reaction between amino and carboxyl groups, GO-PEI carriers have been formed. The reaction is accompanied by partial reduction and cationization. After combining polyanionic POM clusters on the surface of the GO-PEI carrier nanosheets via electrostatic interaction, the formed POMs@GO-PEI as a flakelike nanocomposite is used as a catalyst for clean and green catalysis. The branched PEI intermediate capping layer not only electrostatically collects the POMs onto the GO substrate but also supports the adsorption of the gaseous substrate $CO_2$. Finally, the attached POMs act as Lewis acid catalysts to catalyze the cycloaddition reaction of $CO_2$ with surrounding epoxides. GO with sheet-like features allows the POMs to be well dispersed and have a very high loading content. More importantly, the partially reduced GO acts as a local heater close to the POM catalytic center. It was concluded that the local heating is beneficial to accelerate the catalytic reaction and the mass transfer of epoxides. Using the currently designed catalysts possessing integrated functions, the photothermal catalysis greatly boosts the reaction to 98.9% conversion of the epoxide and 99% selectivity within 4 h, at a TOF value up to 2718 $h^{-1}$ at ambient conditions and atmospheric pressures. The mild reaction conditions, almost complete conversion, high selectivity and TOF values, and recycled catalysts constitute a suitable strategy in green chemistry.

The above descriptions are merely preferred embodiments of the present disclosure and do not limit to the present disclosure in any form. It should be noted that for those ordinary skilled in the art, several improvements and modifications could be made without departing from the principle of the present disclosure. These improvements and modifications should be regarded as falling within the protection scope of the present disclosure.

What is claimed is:

1. A method for preparing a near-infrared (NIR) photothermal catalyst, comprising:
   mixing a graphene oxide (GO) dispersion and a dehydrating agent to obtain a GO solution;
   mixing the GO solution and branched polyethyleneimine (PEI) and then drying to obtain a GO-PEI carrier; and
   mixing the GO-PEI carrier with water and adjusting a pH value to be within a range of 2 to 4.5, adding dropwise a monosubstituted Keggin-type polyoxometalate (POM) aqueous solution, and conducting an ion replacement reaction to obtain the NIR photothermal catalyst, wherein a solute of the monosubstituted Keggin-type POM aqueous solution is $K_6SiW_{11}Co(H_2O)O_{39}$ or $H_4SiW_{11}Ce(H_2O)_4O_{39}$.

2. The method according to claim 1, wherein a molar ratio of GO to PEI in the GO-PEI carrier is 5:1, 1:1, 1:5, 1:10, 1:20, 1:40 or 1:100.

3. The method according to claim 1, wherein a molecular weight $M_w$ of branched PEI is 1,800.

4. The method according to claim 1, wherein the pH value is adjusted with a hydrochloric acid solution; the hydrochloric acid solution has a concentration of 1.0 mol/L.

5. The method according to claim 1, wherein the ion replacement reaction is conducted at room temperature; the ion replacement reaction is conducted for 12 h to 24 h.

6. A NIR photothermal catalyst prepared by the method according to claim 1, comprising a GO-PEI carrier and a POM loaded on a surface of the GO-PEI carrier, wherein the POM is $K_6SiW_{11}Co(H_2O)O_{39}$ or $H_4SiW_{11}Ce(H_2O)_4O_{39}$; the POM is electrostatically attached to the surface of the GO-PEI carrier; and in the GO-PEI carrier, branched PEI is covalently grafted to GO.

7. The NIR photothermal catalyst according to claim 6, wherein a mass percentage of the POM in the NIR photothermal catalyst is within a range of 55% to 70%.

8. A method for using the NIR photothermal catalyst according to claim 6, wherein the NIR photothermal catalyst is used in the field of photothermal catalysis.

9. The method according to claim 8, wherein the NIR photothermal catalyst is used in the form of a NIR photothermal catalyst solution; and the NIR photothermal catalyst solution has a concentration of 5 mg/mL to 7 mg/mL.

10. The method according to claim 8, wherein the NIR photothermal catalyst is used as a catalyst for a cycloaddition reaction of carbon dioxide ($CO_2$) and an epoxide.

11. The method according to claim 3, wherein a molar ratio of GO to PEI in the GO-PEI carrier is 5:1, 1:1, 1:5, 1:10, 1:20, 1:40 or 1:100.

12. The NIR photothermal catalyst according to claim 6, wherein a molar ratio of GO to PEI in the GO-PEI carrier is 5:1, 1:1, 1:5, 1:10, 1:20, 1:40 or 1:100.

13. The NIR photothermal catalyst according to claim 6, wherein a molecular weight $M_w$ of branched PEI is 1,800.

14. The NIR photothermal catalyst according to claim 6, wherein the pH value is adjusted with a hydrochloric acid solution; the hydrochloric acid solution has a concentration of 1.0 mol/L.

15. The NIR photothermal catalyst according to claim 6, wherein the ion replacement reaction is conducted at room temperature; the ion replacement reaction is conducted for 12 h to 24 h.

16. The method according to claim 8, wherein a mass percentage of the POM in the NIR photothermal catalyst is within a range of 55% to 70%.

\* \* \* \* \*